US010121120B2

(12) United States Patent
Deguchi

(10) Patent No.: US 10,121,120 B2
(45) Date of Patent: Nov. 6, 2018

(54) INFORMATION PROCESSING SYSTEM AND RECORDING DEVICE

(71) Applicants: Tokyo Institute of Technology, Meguro-ku, Tokyo (JP); JAPAN SCIENCE AND TECHNOLOGY AGENCY, Kawaguchi-Shi, Saitama (JP)

(72) Inventor: Hiroshi Deguchi, Tokyo (JP)

(73) Assignees: JAPAN SCIENCE AND TECHNOLOGY AGENCY, Kawaguchi-Shi, Saitama (JP); TOKYO INSTITUTE OF TECHNOLOGY, Meguro-Ku, Tokyo (JP)

( * ) Notice: Subject to any disclaimer, the term of this patent is extended or adjusted under 35 U.S.C. 154(b) by 53 days.

(21) Appl. No.: 14/400,171

(22) PCT Filed: May 8, 2013

(86) PCT No.: PCT/JP2013/002956
§ 371 (c)(1),
(2) Date: Nov. 10, 2014

(87) PCT Pub. No.: WO2013/168419
PCT Pub. Date: Nov. 14, 2013

(65) Prior Publication Data

US 2015/0100466 A1 Apr. 9, 2015

(30) Foreign Application Priority Data

May 10, 2012 (JP) ................................ 2012-108592

(51) Int. Cl.
*G06Q 10/08* (2012.01)
*G06Q 50/06* (2012.01)
(Continued)

(52) U.S. Cl.
CPC ........... *G06Q 10/087* (2013.01); *G06Q 10/06* (2013.01); *G06Q 10/10* (2013.01); *G06Q 50/06* (2013.01); *H04L 12/2827* (2013.01); *H04L 67/12* (2013.01)

(58) Field of Classification Search
USPC .......................................................... 705/28
See application file for complete search history.

(56) References Cited

U.S. PATENT DOCUMENTS

2010/0235008 A1* 9/2010 Forbes, Jr. ............ G06Q 10/00 700/291
2011/0125657 A1* 5/2011 Boss ..................... G06Q 10/06 705/317
(Continued)

FOREIGN PATENT DOCUMENTS

JP S60122198 A 6/1985
JP 2004526245 A 8/2004
(Continued)

OTHER PUBLICATIONS

International Preliminary Report on Patentability for International Application No. PCT/JP2013/002956 dated Nov. 11, 2014, with English translation.
(Continued)

*Primary Examiner* — Garcia Ade
(74) *Attorney, Agent, or Firm* — Cantor Colburn LLP

(57) ABSTRACT

An energy event recording apparatus is mounted on each of a plurality of equipment installed at a business facility. When a change in the amount of the flow or stock of energy is detected in the apparatus mounted, each of a plurality of the energy event recording apparatuses records journal information, which associates the amount of change to a debit side item and a credit side item, respectively, and notifies an energy management server of the journal information. The energy management server calculates pieces of
(Continued)

| DEBTOR | MONEY AMOUNT | CREDITOR | MONEY AMOUNT |
|---|---|---|---|
| CASH | 200 | APPLE | 100 |
| | | PROFIT | 100 |
| UTILITIES | 50 | CASH | 50 |

| | | | |
|---|---|---|---|
| PROFIT | 100 | OPERATING REVENUE | 100 |
| OPERATING REVENUE | 50 | UTILITIES | 50 |

journal information conveyed from a plurality of recording apparatuses, respectively, based on the debit side item and the credit side item.

4 Claims, 19 Drawing Sheets

(51) Int. Cl.

| | |
|---|---|
| ***H04L 12/28*** | (2006.01) |
| ***G06Q 10/10*** | (2012.01) |
| ***G06Q 10/06*** | (2012.01) |
| *G06Q 10/00* | (2012.01) |
| *H04L 29/08* | (2006.01) |

(56) References Cited

U.S. PATENT DOCUMENTS

| | | | | |
|---|---|---|---|---|
| 2011/0137826 | A1* | 6/2011 | West | G06Q 30/04 705/412 |
| 2012/0109798 | A1* | 5/2012 | Shelton | B60L 3/0069 705/34 |
| 2012/0265655 | A1* | 10/2012 | Stroh | G06Q 40/00 705/30 |
| 2012/0330470 | A1* | 12/2012 | Hjelm | G06Q 10/06 700/286 |

FOREIGN PATENT DOCUMENTS

| | | | |
|---|---|---|---|
| JP | 2005250914 | A | 9/2005 |
| JP | 2011257949 | A | 12/2011 |
| JP | 2012010530 | A | 1/2012 |
| WO | 2011061075 | A2 | 5/2011 |
| WO | 2011064882 | A1 | 6/2011 |
| WO | 2011111240 | A1 | 9/2011 |
| WO | 2012058421 | A2 | 5/2012 |

OTHER PUBLICATIONS

International Search Report corresponding to International Application No. PCT/JP2013/002956; dated Aug. 6, 2013, with English translation.

David Ellerman, "Double Entry Multidimensional Accounting," Omega International Journal of Management Science; Jan. 1986, pp. 13-22, vol. 14, No. 1.

David P. Ellerman, "Economics, Accounting, and Property Theory" Lexington Books, D.C. Health and Company; 1982, pp. xi-205.

European Search Report corresponding to European Patent Application No. 13787581.1-1955/2849146 PCT/JP2013/002956; dated Dec. 11, 2015.

Notification of Reasons for Refusal corresponding to JP Application No. 2014-514382; dated May 30, 2017.

European Office Action corresponding to Application No. 13787581.1; dated Apr. 6, 2018.

* cited by examiner

FIG.1A

| DEBTOR | MONEY AMOUNT | CREDITOR | MONEY AMOUNT |
|---|---|---|---|
| CASH | 200 | APPLE | 100 |
| | | PROFIT | 100 |
| UTILITIES | 50 | CASH | 50 |

FIG.1B

| | | | |
|---|---|---|---|
| PROFIT | 100 | OPERATING REVENUE | 100 |
| OPERATING REVENUE | 50 | UTILITIES | 50 |

FIG.3

```
program USER CODE EXAMPLE 1 {
    var C:ExAlgeSet = [ 200@<"CASH"> + 100@<"WHEAT">,
200@<"CASH"> + 200@<"SOY">];
    var D:ExBaseSet = [<"CASH">, <"WHEAT">];
    var aset:ExAlgeSet = { proj[b](x) | x <- C, b <- D, !isEmpty(x) };
    var alpha:Exalge = sum(aset);
    println("alpha = " + alpha);
}
```

FIG.4A

```
exalge2.ExAlgeSet
C
 =
new exalge2.ExAlgeSet(
createArrayList(
(new exalge2.Exalge(
new exalge2.ExBase(new String[]{
"CASH",exalge2.ExBase.NO_HAT})
, new java.math.BigDecimal("200")))
.plus(
new exalge2.Exalge(
new exalge2.ExBase(new String[]{
"WHEAT",exalge2.ExBase.NO_HAT})
, new java.math.BigDecimal("100")))
,(new exalge2.Exalge(
new exalge2.ExBase(new String[]{
"CASH",exalge2.ExBase.NO_HAT})
, new java.math.BigDecimal("200")))
.plus(
new exalge2.Exalge(
new exalge2.ExBase(new String[]{
"SOY",exalge2.ExBase.NO_HAT})
, new java.math.BigDecimal("200"))))
);
```

FIG.4B

```
java.util.List<exalge2.Exalge> involv$6 =
new java.util.ArrayList<exalge2.Exalge>();
l_involv$6:
for(exalge2.Exalge x :
C) {
for(exalge2.ExBase b :
D) {
if (!(!
(isEmpty(
x)))) continue;
involv$6.add((x)
.projection(
b));
}
}
exalge2.ExAlgeSet
aset
 = new exalge2.ExAlgeSet(
involv$6
);
```

FIG.5

```
program USER CODE EXAMPLE 2 {
    var dataset:DtAlgeSet = [
        "YAMADA"@<<"name","string">> + 5@<<"score","decimal">>,
        "TANAKA"@<<"name","string">> + 3@<<"score","decimal">>,
        "SUZUKI"@<<"name","string">> + 4@<<"score","decimal">>,
        "SATO"@<<"name","string">> + 2@<<"score","decimal">>,
        "HONDA"@<<"name","string">> + 5@<<"score","decimal">> ]

    var aset:ExAlgeSet = { 1@<"4 OR MORE","PERSON"> | x <- dataset,
v = getDecimal[<<"score","decimal">>](x), v >= 4 };
    println("aset = " + aset);
    var ret:Exalge = sum(aset);
    println("ret = " + ret);
}
```

FIG.6A

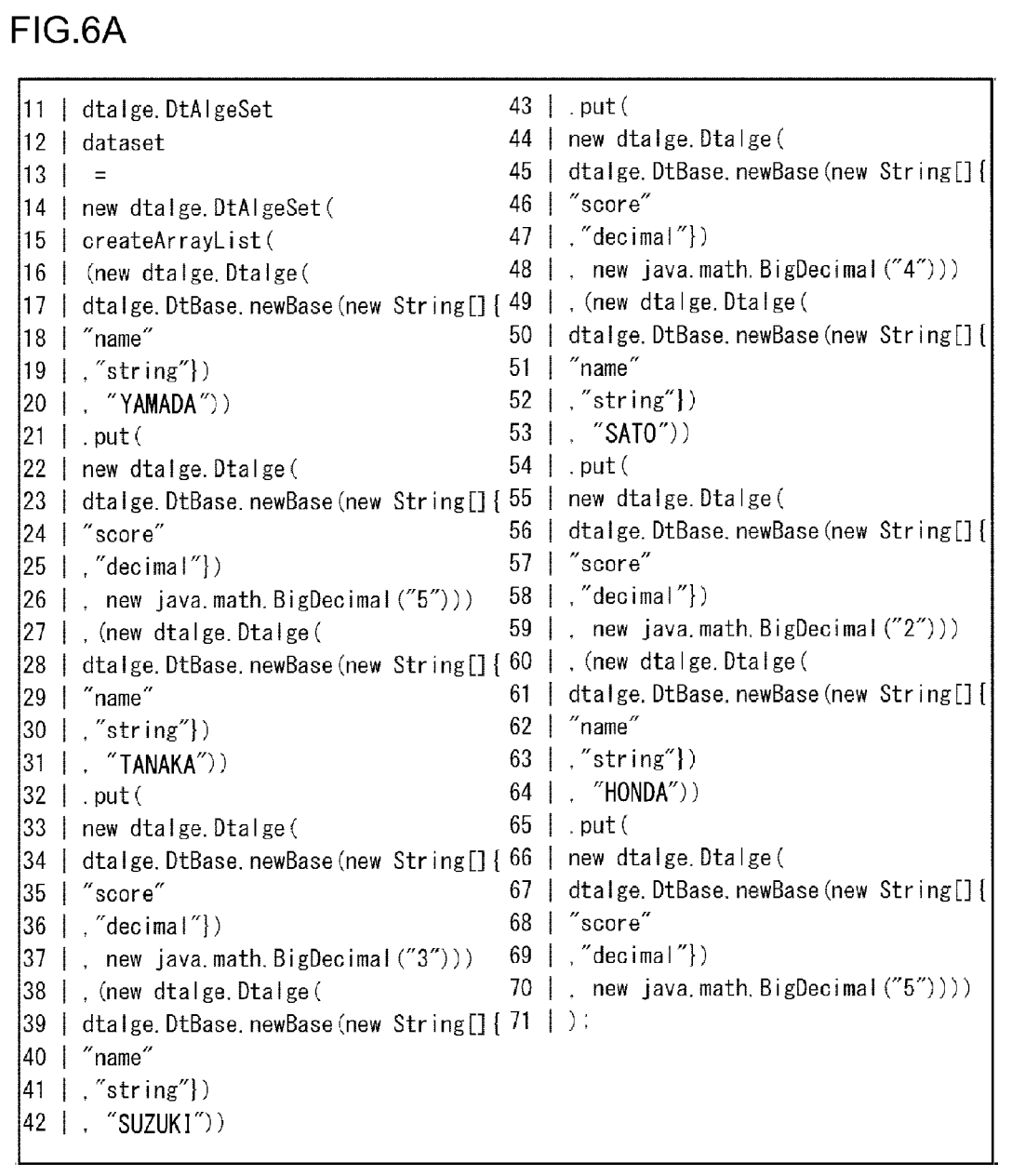

```
dtalge.DtAlgeSet
dataset
 =
new dtalge.DtAlgeSet(
createArrayList(
 (new dtalge.Dtalge(
dtalge.DtBase.newBase(new String[]{
"name"
,"string"})
, "YAMADA"))
.put(
new dtalge.Dtalge(
dtalge.DtBase.newBase(new String[]{
"score"
,"decimal"})
, new java.math.BigDecimal("5")))
,(new dtalge.Dtalge(
dtalge.DtBase.newBase(new String[]{
"name"
,"string"})
, "TANAKA"))
.put(
new dtalge.Dtalge(
dtalge.DtBase.newBase(new String[]{
"score"
,"decimal"})
, new java.math.BigDecimal("3")))
,(new dtalge.Dtalge(
dtalge.DtBase.newBase(new String[]{
"name"
,"string"})
, "SUZUKI"))
.put(
new dtalge.Dtalge(
dtalge.DtBase.newBase(new String[]{
"score"
,"decimal"})
, new java.math.BigDecimal("4")))
,(new dtalge.Dtalge(
dtalge.DtBase.newBase(new String[]{
"name"
,"string"})
, "SATO"))
.put(
new dtalge.Dtalge(
dtalge.DtBase.newBase(new String[]{
"score"
,"decimal"})
, new java.math.BigDecimal("2")))
,(new dtalge.Dtalge(
dtalge.DtBase.newBase(new String[]{
"name"
,"string"})
, "HONDA"))
.put(
new dtalge.Dtalge(
dtalge.DtBase.newBase(new String[]{
"score"
,"decimal"})
, new java.math.BigDecimal("5"))))
);
```

FIG.6B

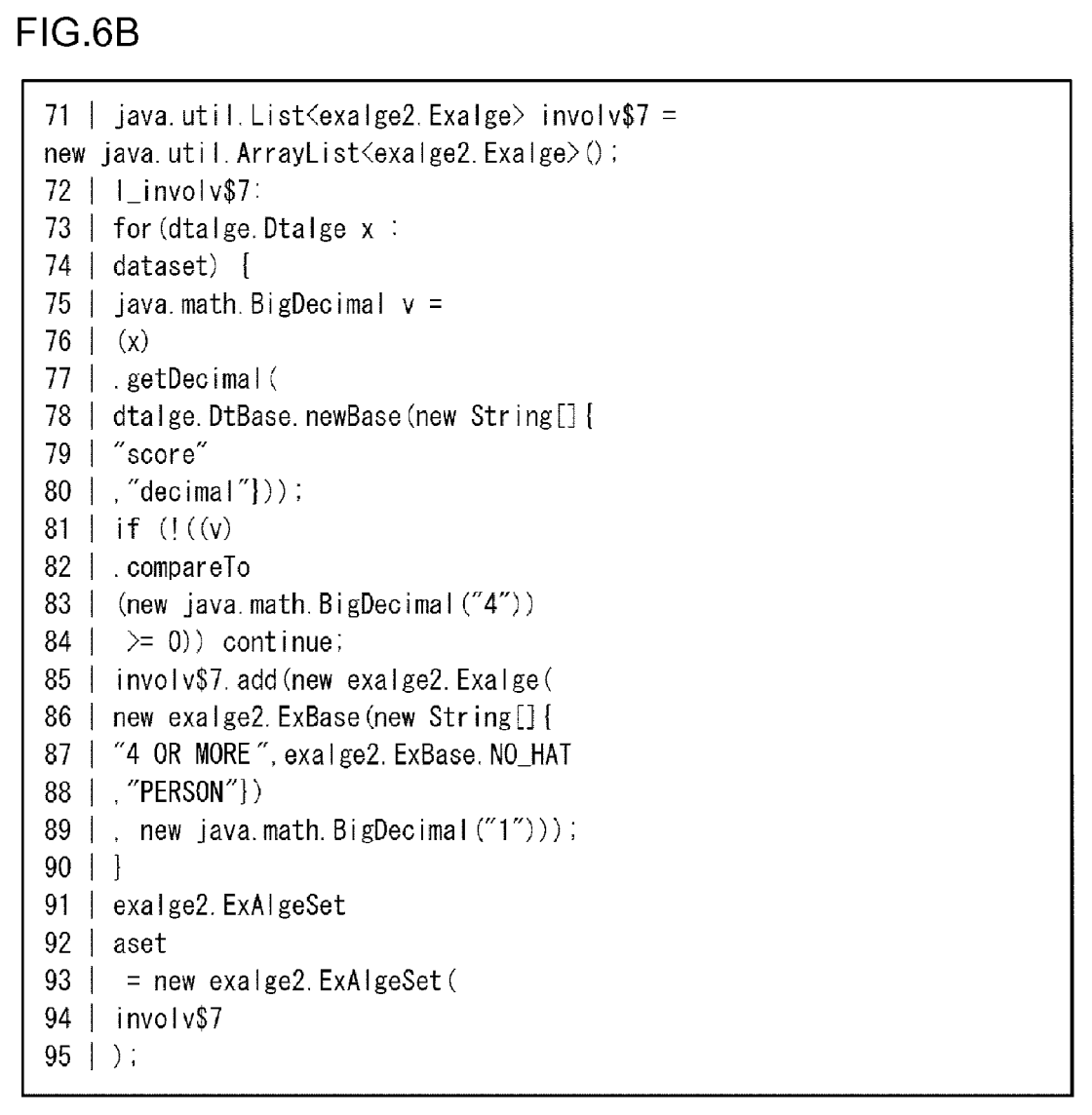

```
java.util.List<exalge2.Exalge> involv$7 =
new java.util.ArrayList<exalge2.Exalge>();
l_involv$7:
for(dtalge.Dtalge x :
dataset) {
java.math.BigDecimal v =
(x)
.getDecimal(
dtalge.DtBase.newBase(new String[]{
"score"
,"decimal"}));
if (!((v)
.compareTo
(new java.math.BigDecimal("4"))
 >= 0)) continue;
involv$7.add(new exalge2.Exalge(
new exalge2.ExBase(new String[]{
"4 OR MORE",exalge2.ExBase.NO_HAT
,"PERSON"})
, new java.math.BigDecimal("1")));
}
exalge2.ExAlgeSet
aset
 = new exalge2.ExAlgeSet(
involv$7
);
```

FIG.11A

| EVENT | DEBIT SIDE ITEMS | | CREDIT SIDE ITEMS | |
|---|---|---|---|---|
| | ^ IS TO BE SET OR NOT? | BASIS DATA | ^ IS TO BE SET OR NOT? | BASIS DATA |
| WASHING | NO | ELECTRIC POWER CONSUMED, ELUnit, TIME, HOUSEHOLD ACCOUNT | YES | CASH, YEN, TIME, HOUSEHOLD ACCOUNT |

FIG.11B

| EVENT | DEBIT SIDE ITEMS | | CREDIT SIDE ITEMS | |
|---|---|---|---|---|
| | ^ IS TO BE SET OR NOT? | BASIS DATA | ^ IS TO BE SET OR NOT? | BASIS DATA |
| SOLAR POWER GENERATION | NO | ELECTRIC ENERGY, ELUnit, TIME, HOUSEHOLD ACCOUNT | NO | ELECTRIC POWER REVENUE, ELUnit, TIME, HOUSEHOLD ACCOUNT |

FIG.11C

| EVENT | DEBIT SIDE ITEMS | | CREDIT SIDE ITEMS | |
|---|---|---|---|---|
| | ^ IS TO BE SET OR NOT? | BASIS DATA | ^ IS TO BE SET OR NOT? | BASIS DATA |
| POWER STORAGE | NO | ELECTRIC ENERGY ACCUMULATED, ELUnit, TIME, HOUSEHOLD ACCOUNT | YES | ELECTRIC ENERGY, ELUnit, TIME, HOUSEHOLD ACCOUNT |

FIG.11D

| EVENT | DEBIT SIDE ITEMS | | CREDIT SIDE ITEMS | |
|---|---|---|---|---|
| | ^ IS TO BE SET OR NOT? | BASIS DATA | ^ IS TO BE SET OR NOT? | BASIS DATA |
| POWER SELLING | NO | CASH, YEN, TIME, HOUSEHOLD ACCOUNT | YES | ELECTRIC ENERGY, ELUnit, TIME, HOUSEHOLD ACCOUNT |

FIG.13

| DEBIT SIDE | CREDIT SIDE | |
|---|---|---|
| X<ELECTRIC POWER REVENUE, YEN, TIME, HOUSEHOLD ACCOUNT> | X<INTERNAL RESERVE, YEN, TIME, HOUSEHOLD ACCOUNT> | 80 |
| Y<INTERNAL RESERVE, YEN, TIME, HOUSEHOLD ACCOUNT> | Y<ELECTRIC POWER CONSUMED, YEN, TIME, HOUSEHOLD ACCOUNT> | 82 |

90 x[WASHING] = 10^<CASH, YEN, TIME, HOUSEHOLD ACCOUNT> +
0.1<ELECTRIC POWER CONSUMED, ELUnit, TIME, HOUSEHOLD ACCOUNT> x[AIR CONDITIONER] = 20^<CASH, YEN, TIME, HOUSEHOLD ACCOUNT> +
0.2<ELECTRIC POWER CONSUMED, ELUnit, TIME, HOUSEHOLD ACCOUNT> x[TV] = 5^<CASH, YEN, TIME, HOUSEHOLD ACCOUNT > +
0.05<ELECTRIC POWER CONSUMED, ELUnit, TIME, HOUSEHOLD ACCOUNT> x[MICROWAVE OVEN] = 10^<CASH, YEN, TIME, HOUSEHOLD ACCOUNT> +
0.1<ELECTRIC POWER CONSUMED, ELUnit, TIME, HOUSEHOLD ACCOUNT> x[ELECTROMAGNETIC COOKER] = 10^<CASH, YEN, TIME, HOUSEHOLD ACCOUNT > +
0.1<ELECTRIC POWER CONSUMED, ELUnit, TIME, HOUSEHOLD ACCOUNT> x[ELECTRIC POT] = 3^<CASH, YEN, TIME, HOUSEHOLD ACCOUNT> +
0.03<ELECTRIC POWER CONSUMED, ELUnit, TIME, HOUSEHOLD ACCOUNT> x[GAS COOKER] = 1^< CASH, YEN, TIME, HOUSEHOLD ACCOUNT> +
0.1<ELECTRIC POWER CONSUMED, GasUnit, TIME, HOUSEHOLD ACCOUNT>

92 x[SOLAR POWER GENERATION] = 20<ELECTRIC ENERGY, ELUnit, TIME,
HOUSEHOLD ACCOUNT> + 20<ELECTRIC POWER REVENUE, ELUnit, TIME,
HOUSEHOLD ACCOUNT>

94 x[POWER STORAGE] = 10<ELECTRIC ENERGY ACCUMULATED, ELUnit, TIME,
HOUSEHOLD ACCOUNT> + 10^<ELECTRIC ENERGY, ELUnit, TIME, HOUSEHOLD
ACCOUNT>

96 X[POWER SELLING] = 1000< CASH, YEN, TIME, HOUSEHOLD ACCOUNT> +
10^<ELECTRIC ENERGY, ELUnit, TIME, HOUSEHOLD ACCOUNT>

INFORMATION PROCESSING SYSTEM AND RECORDING DEVICE

This is the U.S. national stage of application No. PCT/JP2013/002956, filed on May 8, 2013. Priority under 35 U.S.C. § 119(a) and 35 U.S.C. § 365(b) is claimed from Japanese Application No. 2012-108592, filed May 10, 2012, the disclosure of which is also incorporated herein by reference.

TECHNICAL FIELD

The present invention relates to a data processing technology and, more particularly, to an information processing system and a recording device for energy information.

BACKGROUND ART

Smart grid has been currently proposed as a technology for managing the urban life as a whole. The basic architecture for the smart grid is to design the following three layer models mainly in terms of the electric power energy. That is, the three layers involved here are (1) a measurement layer for measuring the electric power energy, (2) an information and communication layer for electric power, and (3) a management layer for managing the electric power in urban areas (cities).

RELATED ART DOCUMENTS

Patent Documents

[Patent Document 1] Japanese Unexamined Patent Application Publication No. 2011-257949.

DISCLOSURE OF INVENTION

Problems to be Solved by the Invention

The inventor of this disclosure had come to recognize as follows. That is, for the purpose of effectively supporting the decision-making on the installation and its subsequent operation of various energy-related servers at or on the basis of individual homes (household economies), business facilities and local communities, it is necessary to actively incorporate the individual homes, the business facilities and so forth into the entities (active agents) of energy management. To achieve this, the inventor had come to recognize it necessary to create new scheme and system where the amount of change or the rate of change in the energy consumed at the individual household economies, the business facilities and so forth can be described in a well-analyzed manner.

The present invention has been made in view of the foregoing circumstances, and a main purpose thereof is to provide a technology for effectively supporting the decision-making on the installation and its subsequent operation of various energy-related servers at or on the basis of individual household economies, business facilities and local communities. Another exemplary purpose thereof is to provide a technology for managing a cost price concerning an energy management.

Means for Solving the Problem

In order to resolve the foregoing problems, an information processing system according to one embodiment of the present invention includes: a plurality of recording apparatuses that record information on flows or stocks of energy in a plurality of equipment installed at a predetermined organization; and a counting apparatus that calculates pieces of information recorded by the plurality of recording apparatuses. Each of the plurality of recording apparatuses includes: a detector for detecting a change in an amount of the flow or stock of the energy; an item information storage for storing a debit side item and a credit side item by associating the debit side item with the credit side item, wherein the debit side item indicates an attribute serving as a debit side in a double-entry bookkeeping system, and the credit side item indicates an attribute serving as a credit side in the double-entry bookkeeping system and wherein the attribute serving as the debit side and the attribute serving as the credit side are each an attribute, concerning the energy, whose value changes with a change in the amount of the flow or stock of the energy; a journalizing processor for recording journal information when the detector detects the change in the amount of the flow or stock of the energy, the journal information being such that said amount of change is associated respectively to the debit side item and the credit side item; and a notification unit for conveying the journal information, recorded by the journalizing processor, to the counting apparatus. The counting apparatus includes: a counting processor for calculating pieces of journal information conveyed respectively from the plurality of recording apparatuses, based on the debit side item and the credit side item and for recording a calculated result; and an output unit for outputting information on the calculated result recorded by the counting processor to an exterior.

Another embodiment of the present invention relates to a recording apparatus, for recording energy information, mounted on an equipment to be monitored. The recording apparatus includes: a detector that detects a change in an amount of flow or stock of energy in the equipment; an item information storage that stores a debit side item and a credit side item by associating the debit side item with the credit side item, wherein the debit side item indicates an attribute serving as a debit side in a double-entry bookkeeping system, and the credit side item indicates an attribute serving as a credit side in the double-entry bookkeeping system and wherein the attribute serving as the debit side and the attribute serving as the credit side are each an attribute, concerning the energy, whose value changes with a change in the amount of the flow or stock of the energy; a journalizing processor that records journal information when the detector detects the change in the amount of the flow or stock of the energy, the journal information is such that said amount of change is associated respectively to the debit side item and the credit side item; and a notification unit that conveys the journal information, recorded by the journalizing processor, to an external apparatus.

Still another embodiment of the present invention relates to an information processing system. The information processing system includes: a plurality of recording apparatuses; a plurality of distributed computing apparatuses; and a combined computing apparatus. Each of the plurality of recording apparatuses includes: a detector for detecting a change in an amount of flow or stock of a predetermined object; an item information storage for storing a debit side item and a credit side item by associating the debit side item with the credit side item, wherein the debit side item indicates an attribute serving as a debit side in a double-entry bookkeeping system, and the credit side item indicates an attribute serving as a credit side in the double-entry bookkeeping system and wherein the attribute serving as the debit side and the attribute serving as the credit side are each an attribute, concerning the object, whose value changes with a change in the amount of the flow or stock of the object; and a journalizing processor for recording journal information when the detector detects the change in the amount of the flow or stock of the object, the journal information is such that said amount of change is associated respectively to the debit side item and the credit side item. Each of the plurality of distributed computing apparatuses includes: an journal information acquiring unit for acquiring, via a communication network, the journal information recorded by at least one predetermined recording apparatus, which is part of the plurality of recording apparatuses; and a counting processor for calculating the journal information recorded by the at least one recording apparatus, based on the debit side item and the credit side item and for recording a calculated result. The combined computing apparatus includes: a calculation result acquiring unit for acquiring, via the communication network, the calculated results recorded by the plurality of distributed computing apparatuses; and a combining unit for generating a calculation result of entire pieces of journal information recorded by the plurality of recording apparatuses by combining the calculated results recorded by the plurality of distributed computing apparatuses, respectively.

Optional combinations of the aforementioned constituting elements, and implementations of the invention in the form of apparatuses, methods, systems, programs, recording media storing the programs, and so forth may also be practiced as additional modes of the present invention.

Advantageous Effects

The present invention effectively supports the decision-making on the installation and its subsequent operation of various energy-related servers at or on the basis of individual household economies, business facilities and local communities.

BRIEF DESCRIPTION OF DRAWINGS

FIGS. 1A and 1B are diagrams each illustrating an example of a sales slip;

FIG. 3 is a diagram illustrating an exemplary user code for operating accounting-type data;

FIG. 4A is a diagram illustrating an execution code that corresponds to the user code shown in FIG. 3;

FIG. 4B is a diagram illustrating an execution code that corresponds to the user code shown in FIG. 3;

FIG. 5 is a diagram illustrating an exemplary user code for operating record-type data;

FIG. 6A is a diagram illustrating an execution code that corresponds to the user code shown in FIG. 5;

FIG. 6B is a diagram illustrating an execution code that corresponds to the user code shown in FIG. 5;

FIG. 11A to FIG. 11D each shows exemplary data stored in an item information storage;

FIG. 13 shows exemplary data stored in a transfer rule storage;

FIG. 14 shows a list of journal information recorded by a plurality of energy event recording apparatuses;

Figure 2:
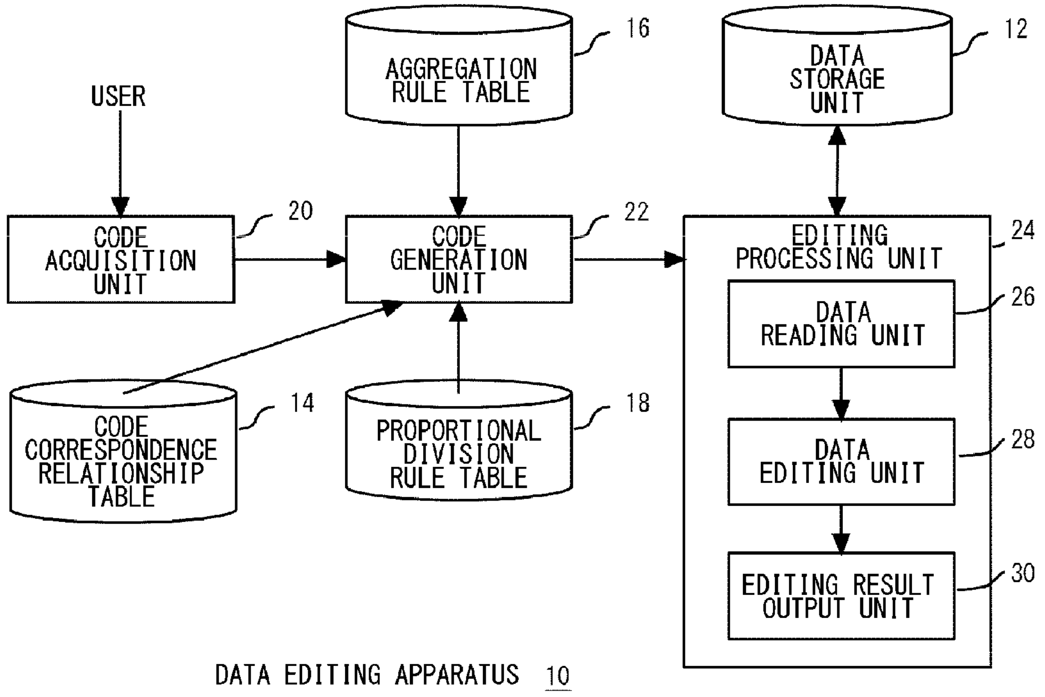
FIG. 2 is a block diagram illustrating a functional configuration of a data editing apparatus according to base technology 2.

MODES FOR CARRYING OUT THE INVENTION (Base Technology 1)

An explanation is given of exchange algebra, on which a data editing technology shown in the present embodiment is based, before explaining the configuration of the embodiment of the present invention.

The inventor of the present invention considers that 80 to 90 percent of data in an organization such as a company can be expressed by two data structures shown in the following.

1. Multi-Classification Numerical Value Type (Hereinafter, Also Referred to as "Accounting Type Data")

This is a combination of a data value and a data attribute (hereinafter, also referred to as "basis") where a numerical value is used as the data value and where a name, a unit, a time, and a subject (entity) are used as the data attribute. For example, data is expressed as: 40<cash, yen>+30<tangerine, piece> . . . .

2. Multi-Classification Mixed Type (Hereinafter, Also Referred to as "Record Type Data")

This is a combination of a data value and a basis where numerical values or various literals other than a numerical value are used as the data value and the base. For example, data is expressed as: 55<age>+Taro Yamada <name>+ Tsugaru <favorite fruit> . . . .

A detailed explanation is given mainly regarding accounting type data in the following.

Accounting type data belongs to an algebraic system (hereinafter, also referred to as "exchange algebra") for collectively expressing numerical value data provided for each classified item of some sort and then performing calculation and can be also considered as exchange algebra data. A basis (i.e., classification item) in the accounting type data is composed of four items: <name, unit, time, subject>. The data is expressed by a combination of respective values for one or more bases, in other words, the data is expressed by the sum of the values for one or more bases.

Example 1: x=200<apple, yen, #, #>+400<saury, yen, #, #>

Example 2: y=200<apple, yen, first quarter of 2006, #>+400<apple, yen, second quarter of 2006, #>+720<apple, yen, third quarter of 2006, #>

In the above Example 1, both times and entities are omitted. In the above Example 2, the entities are omitted. Example 2 can be also considered as an expression of time-series data. For entities for the bases, identification information of organizations such as a name of a company and the like may be set.

Advantages of expression by exchange algebra include being able to express data using various bases (classifications) and being able to express bases in characters, not in program codes, that are easily understandable to humans. Further, expression by exchange algebra also allows for unified data editing by calculation called transfer as described later.

In exchange algebra according to the embodiment, a symbol, ^ (hat), is used instead of a negative numerical value. For example, an equation, x=20^<apple, #, #, #>, shows that apples are reduced by 20. In other words, "^" represents a basis that means an opposite item for offsetting a given item. Also, as an operator showing an offsetting operation, "~ (bar)" is introduced. Examples thereof are shown in the following.

x1=30<cash>+20<apple>+50<debt> y1=^x1=30^<cash>+20^<apple>+50^<debt>

~(y1+x1)=(30^<cash>+20^<apple>+50^<debt>)+(30<cash>+20<apple>+50<debt>)=0

An explanation is now given regarding a transfer operation by exchange algebra. There is an operation called transfer in bookkeeping. This is considered as a type of a recategorization (basis conversion) operation. An example is now shown where a sales slip of a vegetable shop shown in FIG. 1A is transferred to a sales slip shown in FIG. 1B.

Transactions in FIGS. 1A and 1B can be expressed in yen terms as shown in the following.

x1=200<cash, yen>+100^<apple, yen>+100<profit, yen> x2=50<utilities, yen>+50^<cash, yen> x3=100^<profit, yen>+100<operating revenue, yen> x4=50^<operating revenue, yen>+50^<utilities, yen> y=x1+x2+x3+x4=(200<cash, yen>+100^<apple, yen>+100<profit, yen>)+(50<utilities, yen>+50^<cash, yen>)+(100^<profit, yen>+100<operating revenue, yen>)+(50^<operating revenue, yen>+50^<utilities, yen>)

~y=150<cash, yen>+100^<apple, yen>+50<operating revenue, yen>

An explanation is now given of aggregation and proportional division, which are considered to be transfer operations.

1. Aggregation

It is assumed that there are 300 yen Tsugaru, 200 yen Fuji, and 100 yen Kougyoku (Tsugaru, Fuji, and Kougyoku each are a single breed of apples). This is expressed as: x=300<Tsugaru, yen>+200<Fuji, yen>+100<Kougyoku, yen>. This operation of collectively classifying Tsugaru, Fuji, and Kougyoku as "apple" is a type of a transfer and referred to as aggregation. A map showing a correspondence relationship, {Tsugaru, Fuji, Kougyoku}→{apple}, needs to be provided as a precondition.

In this example, an element, F(x)=300^<Tsugaru, yen>+200^<Fuji, yen>+100^<Kougyoku, yen>+300<apple, yen>+200<apple, yen>+100<apple, yen>, is created in accordance with the above map showing the correspondence relationship. The value of the basis <apple> represents respective values of the bases <Tsugaru>, <Fuji>, and <Kougyoku> to be aggregated. In other words, a totalization value of the respective values of the bases <Tsugaru>, <Fuji>, and <Kougyoku> to be aggregated is calculated as the value of the basis <apple>.

A transfer G(x) that shows aggregation is provided using F(x) as follows: ~{x+F(x)}. In other words, G(x)=~{x+F(x)}=(300<Tsugaru, yen>+200<Fuji, yen>+100<Kougyoku, yen>)+(300^<Tsugaru, yen>+200^<Fuji, yen>+100^<Kougyoku, yen>+300<apple, yen>+200<apple, yen>+100<apple, yen>)=600<apple, yen>.

2. Proportional Division

Proportional division is further division of a single classification item into a plurality of classification items. For example, in the example shown in the aggregation, proportional division means division of the value corresponding to the basis <apple> into respective values of Tsugaru, Fuji, and Kougyoku. A proportional division ratio for{apple}→{Tsugaru, Fuji, Kougyoku} needs to be provided as a prerequisite and is 1:1:1 in this case.

In this example, an element, F(x)=600^<apple, yen>+200<Tsugaru, yen>+200<Fuji, yen>+200<Kougyoku, yen>, is created for x=600<apple, yen> in accordance with the above proportional division ratio.

A transfer G(x) that shows proportional division is provided using F(x) as follows: ~{x+F(x)}. In other words, G(x)=~{x+F(x)}=600<apple, yen>+(600^<apple, yen>+200<Tsugaru, yen>+200<Fuji, yen>+200<Kougyoku, yen>)=200<Tsugaru, yen>+200<Fuji, yen>+200<Kougyoku, yen>.

(Base Technology 2)

An explanation is given in the following regarding an information processing apparatus (hereinafter, referred to as "data editing apparatus") that performs a data editing process using the idea of the above exchange algebra. In the present embodiment, a user describes data editing details using intensive notation, which is a method of describing a set by providing conditions necessary and sufficient for an object to belong to the set. Based on the editing details described by the intensive notation, the data editing apparatus according to the embodiment outputs a program code described in extensive notation, which is a method of describing a set by listing all the elements of the set. The data editing apparatus then reads data to be edited into memory as a data object in a format that corresponds to exchange algebra and performs an editing process on the data by executing the above program code.

FIG. 2 is a block diagram illustrating a functional configuration of a data editing apparatus 10 according to base technology 2. The data editing apparatus 10 includes a data storage unit 12, a code correspondence relationship table 14, an aggregation rule table 16, a proportional division rule table 18, a code acquisition unit 20, a code generation unit 22, and an editing processing unit 24.

The blocks shown in the block diagram of the specification are implemented in the hardware by any CPU of a computer, other elements, or mechanical devices and in software by a computer program or the like. FIG. 2 depicts functional blocks implemented by the cooperation of hardware and software. Thus, a person skilled in the art should appreciate that there are many ways of accomplishing these functional blocks in various forms in accordance with the components of hardware, software, or the combination of both. For example, the functional blocks of FIG. 2 may be stored in a recording medium as software. The software may be installed in a hard disk of the data editing apparatus 10, read into a main memory of the data editing apparatus 10, and run by a CPU.

The data storage unit 12 is a memory area that stores both data before editing, which is to be edited, and data after the editing. The data storage unit 12 stores a CSV (Comma Separated Values) file associating a data value with a basis for each of the data before the editing and the data after the editing. For example, a line of a CSV file may be "value, the presence of hat, name, unit, time, subject," and a blank line may indicate a separator of elements. It is obvious that the data storage unit 12 may be provided in an information processing apparatus different from the data editing apparatus 10, for example, inside a database server. In this case, an information processing system may be constructed where the database server and the data editing apparatus 10 are connected via a communication network such as LAN, WAN, the Internet, etc.

The code correspondence relationship table 14 is a memory area that stores a correspondence relationship between a program language for describing data editing details (editing operations) by the intensive notation (hereinafter, also referred to as "intensive notation language") and a program language for describing data editing details by the extensive notation (hereinafter, also referred to as "extensive notation language"). It is assumed that the extensive notation language according to the embodiment is a Java (registered trademark) language. Alternatively, the extensive notation language may be other program languages such as a C language.

The correspondence relationship between the intensive notation language and the extensive notation language is, for example, association of a keyword indicating an editing operation in the intensive notation language with a code (function) in which logic for realizing the editing operation in the extensive notation language is implemented. More specifically, a description of a condition for extracting specific data from a plurality of pieces of data in the intensive notation language is associated with a description of a repeat order (command) for sequentially listing a plurality of pieces of data in the extensive notation language. For example, the correspondence relationship is association of a code for specifying input data in the intensive notation language with a code in which logic for reading the input data into memory in the extensive notation language is implemented. A specific example of the correspondence relationship will be described later in FIGS. 3 through 6.

The aggregation rule table 16 is a memory area that stores an aggregation rule defining an aggregation relationship between a plurality of types of bases that needs to be referred to at the time of an aggregation operation. The aggregation rule defines, for example, the above-stated aggregation relationship, {Tsugaru, Fuji, Kougyoku}→{apple}. A basis ("apple" in the above example) that aggregates a plurality of types of bases is referred to as "aggregation basis" in the following. The proportional division rule table 18 is a memory area that stores a proportional division rule defining a proportional division rate of a plurality of types of bases that needs to be referred to at the time of a proportional division operation. The proportional division rule defines, for example, the above-stated proportional division relationship, {apple}→{Tsugaru, Fuji, Kougyoku}, and a proportional division rate, 1:1:1.

The code acquisition unit 20 acquires a program code (hereinafter, also referred to as "user code") that is input by a user via a predetermined input apparatus such as a keyboard. This user code is described in an intensive notation language. A detailed description of a specific example of the user code will follow.

In accordance with the correspondence relationship stored in the code correspondence relationship table 14, the code generation unit 22 generates, based on the user code, a program code (hereinafter, also referred to as "execution code") in which the data editing details described in the user code are described in an extensive notation language. It is assumed that an execution code according to the embodiment is a Java bytecode. More specifically, the code generation unit 22 generates a Java source code that corresponds to the user code and generates a Java bytecode by compiling the source code. A detailed description of a specific example of the execution code will follow.

In accordance with the execution code generated by the code generation unit 22, the editing processing unit 24 edits data to be edited that is stored in the data storage unit 12. The editing processing unit 24 includes a data reading unit 26, a data editing unit 28, and an editing result output unit 30. Needless to say, the function of the editing processing unit 24 (the data reading unit 26 through the editing result output unit 30) may be achieved by the execution of the execution code in a predetermined execution engine. For example, when the execution code is a Java bytecode, the execution engine is a JVM (Java Virtual Machine).

The data reading unit 26 reads the data to be edited from the data storage unit 12 and generates, based on the data, a data object in which a data value and a basis are associated with each other in the memory. The data editing unit 28 sets editing result data by performing an operation on the data object generated by the data reading unit 26. The editing result output unit 30 records, as a CSV file, the editing result data set by the data reading unit 26 and stores the CSV file in the data storage unit 12.

FIG. 3 illustrates an example of a user code for operating accounting type data. In the following code example, line numbers are shown at the left end, and the position of a code is appropriately shown by the line numbers. Specified as data to be edited in FIG. 3 is a set C containing an element, 200<cash>+100<wheat>, and an element, 200<cash>+200<soy>. In the figure, the data to be edited is directly input for the purpose of simplifying the figure. Typically, a data object that indicates input data is generated by specifying the name of a CSV file serving as an input file and a position for describing the input data in the CSV file.

Specified in line 4 in FIG. 3 is a projection process of exchange algebra, that is, a projection operation for extracting a subelement that agrees with a specified basis. More specifically, a process is specified, which is a process of extracting, from the set C, an element that corresponds to the basis <cash> or the base <wheat> and that satisfies a condition where a value is already set and assigning the element to a set aset. Specified in line 5 is a process of adding elements in the set aset. Since the set aset includes 200<cash>, 100<wheat>, and 200<cash>, an addition result alpha is: 400<cash>+100<wheat>. In the figure, an editing result is output to standard output for the purpose of simplifying the figure. Typically, a CSV file is specified as an output file, and the editing result (in this case, the details of the addition result alpha) is recorded in the CSV file.

FIG. 4A illustrates an execution code that corresponds to the user code shown in FIG. 3. More specifically, the execution code is an execution code generated by the code generation unit 22 according to line 2 in FIG. 3 and corresponds to a function of the data reading unit 26. In the explanation of the embodiment, a Java source program is shown as the execution code for the sake of convenience. In the figure, an ExAlge object that corresponds to an element, 200<cash>+100<wheat>, (lines 15-23) and an ExAlge object that corresponds to an element, 200<cash>+200<soy>, (lines 24-32) are stored in an ExAlgeSet object that corresponds to the set C.

FIG. 4B illustrates an execution code that corresponds to the user code shown in FIG. 3. More specifically, the execution code is an execution code generated by the code generation unit 22 according to line 4 in FIG. 3 and corresponds to a function of the data editing unit 28. In the figure, a projection method is called in a double loop of a for loop listing ExAlge objects that correspond to a plurality of elements included in a set C and a for loop listing ExBase objects that correspond to a plurality of bases included in a set D, and a result of a projection process is added to a list. A set aset is then set based on the list.

FIG. 5 illustrates an example of a user code for operating record type data. In the figure, a set dataset is specified that includes five elements: Yamada <name>+5<score>; Tanaka <name>+3<score>; Suzuki <name>+4<score>; Sato <name>+2<score>; and Honda <name>+5<score>.

In line 9 in FIG. 5, a process is specified that assigns an element "1<4 or more, person, #, #>" to a set aset whenever there is an element whose value associated with a basis <score> is four or more. Specified in line 11 is a process of adding elements in the set aset. As a result of this, the set aset includes three elements "1<4 or more, person, #, #>," and "ret=3<4 or more, person, #, #>" is obtained. In other words, this example is directed to totalize the number of people with a score of four or more.

FIG. 6A illustrates an execution code that corresponds to the user code shown in FIG. 5. More specifically, the execution code is an execution code generated by the code generation unit 22 according to lines 2-7 in FIG. 5 and corresponds to a function of the data reading unit 26. In the figure, Dtalge objects that respectively correspond to the above five record type data elements are stored in a DtAlgeSet that corresponds to a set dataset. Various data types are accepted in both a value and a basis for record type data. Thus, information indicating respective data types of a value and a basis are also set for the Dtalge object.

FIG. 6B illustrates an execution code that corresponds to the user code shown in FIG. 5. More specifically, the execution code is an execution code generated by the code generation unit 22 according to line 9 in FIG. 5 and corresponds to a function of the data editing unit 28. In the figure, an element "1<4 or more, person, #, #>" is added to a list when a value that corresponds to a basis <score> is four or more in a for loop listing DtAlgeSet objects that corresponds to a plurality of elements included in a set dataset. A set aset is then set based on the list.

When an aggregation order (function) is set in a user code, the code generation unit 22 generates an execution code for setting an object (hereinafter, also referred to as "intermediate object") that corresponds to a bookkeeping description in reference to the aggregation rule stored in the aggregation rule table 16. More specifically, the code generation unit 22 calculates a totalization value of a plurality of pieces of data to be aggregated and generates an execution code that sets, as an intermediate object, an object indicating an element that adds up data associating the totalization value with an aggregation basis and data indicating the subtraction of the respective values of the plurality of pieces of data to be aggregated (i.e., data where hat attributes are added to the plurality of pieces of original data to be aggregated). This intermediate object corresponds to F(x) shown in the aggregation in the base technology.

The code generation unit 22 then adds up an object indicating an element where the plurality of pieces of original data to be aggregated are added up and the intermediate object. In other words, by offsetting the plurality of pieces of original data to be aggregated with data where hat attributes are added to the plurality of pieces of original data to be aggregated, the code generation unit 22 generates an execution code for storing, in an object for a totalization result, data associating the totalization value of the plurality of pieces of data to be aggregated with the aggregation basis. It is to be noted here that the totalization result will be hereinafter referred to as "counting result", "aggregate result", or "calculated result" also. This execution code corresponds to ~(x+F(x)) shown in the aggregation in the base technology. The code generation unit 22 may further generate an execution code for outputting the details of the intermediate object to a predetermined file. According to the embodiment, by presenting the details of the intermediate object to a user, efficient debugging can be supported, and information that is usable in transfer calculation for bookkeeping can be provided to the user.

When a proportional division order (function) is set in a user code, the code generation unit 22 first generates an execution code for setting the intermediate object in reference to the aggregation rule stored in the proportional division rule table 18, as in the case of aggregation. More specifically, the code generation unit 22 proportionally divides, in accordance with a proportional division rate, the value of data to be proportionally divided and generates an execution code that sets, as an intermediate object, an object indicating an element that adds up data associating proportionally-divided values with respective bases of a destination of the proportional division and data where hat attributes are added to the original data to be proportionally divided. This intermediate object corresponds to F(x) shown in the proportional division in the base technology.

The code generation unit 22 then adds up an object indicating an element of the original data to be proportionally divided and the intermediate object. In other words, by offsetting the original data to be proportionally divided with data where hat attributes are added to the original data to be proportionally divided, the code generation unit 22 generates an execution code for storing, in an object for a proportional division result, data associating the proportionally-divided values with respective bases of the destination of the proportional division. This execution code corresponds to ~(x+F(x)) shown in the proportional division in the base technology. The code generation unit 22 may further generate an execution code for outputting the details of the intermediate object to a predetermined file, as in the case of aggregation.

An explanation is given of the operation of the above configuration in the following.

Figure 7:
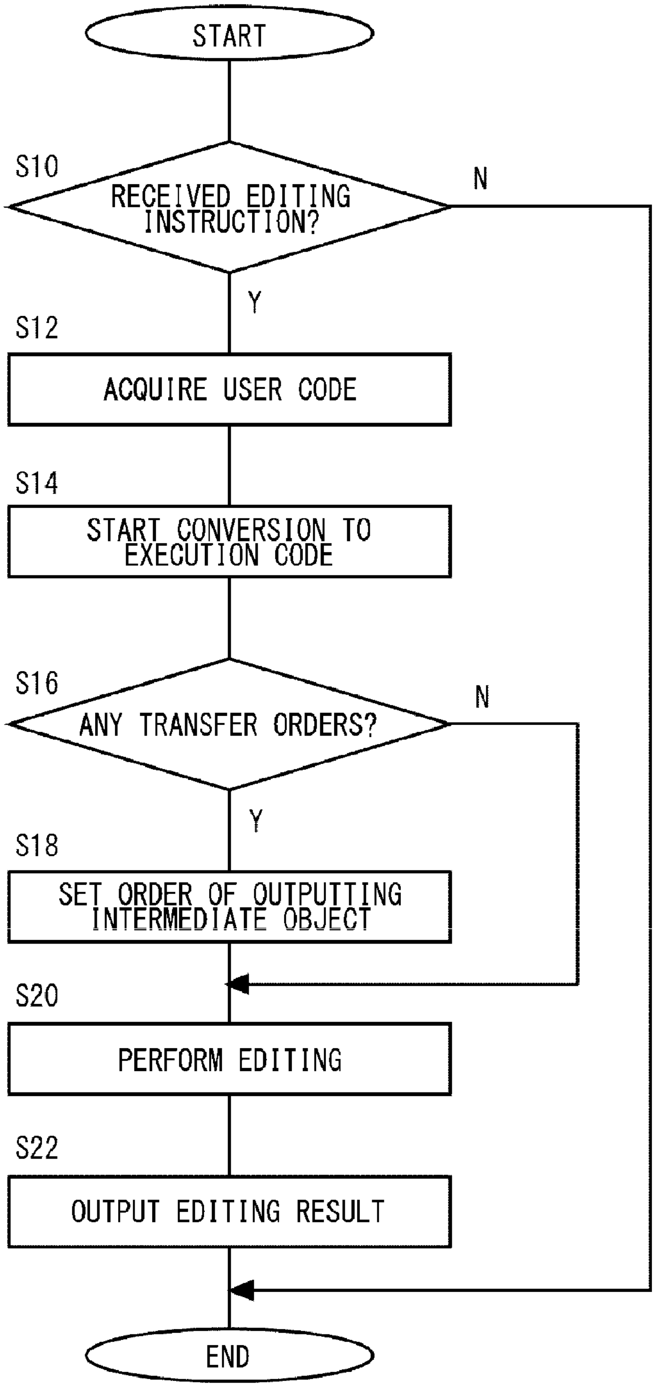
FIG. 7 is a flowchart illustrating an operation of a data editing apparatus.

FIG. 7 is a flowchart illustrating the operation of the data editing apparatus 10. The user first describes data editing details using an intensive notation language by intensive notation and inputs a data editing instruction specifying a program code thereof to the data editing apparatus 10. When the data editing apparatus 10 receives the data editing instruction via a predetermined input apparatus (Y of S10), the code acquisition unit 20 of the data editing apparatus 10 acquires, as a user code, the program code input by the user (S12). In accordance with a correspondence relationship between a user code and an execution code stored in the code correspondence relationship table 14, the code generation unit 22 starts a process of generating an execution code based on the user code (S14).

When there is a transfer order such as an aggregation order or a proportional division order in the user code (Y of S16), the code generation unit 22 sets, in the execution code, an order of outputting an intermediate object for an offset process according to the transfer order (S18). When there is no transfer order in the user code (N of S16), S18 is skipped. The editing processing unit 24 performs an editing process on data to be edited in accordance with the execution code that has been generated (S20). For example, the data reading unit 26 reads the data to be edited, which is specified in the user code and the execution code generated based on the user code, from a CSV file for input data storage of the data storage unit 12 and generates a data object. The data editing unit 28 performs an editing operation (such as a projection operation, an aggregation operation, and a proportional division operation based on a basis) specified in the execution code for the data object that has been generated and generates a data object that indicates an editing result. The editing result output unit 30 outputs an editing result by the editing processing unit 24, for example, the details (attribute values) of the data object that has been generated by the data editing unit 28 and that indicates the editing result, to a CSV file for editing result storage of the data storage unit 12 (S22). When the data editing apparatus 10 does not receive any data editing instructions (N of S10), S12 and subsequent steps thereof are skipped.

According to the data editing apparatus 10 of the present embodiment, data that is conventionally treated in an RDB can be expressed as a data object that corresponds to accounting type data or a data object that corresponds to record type data. Thereby, the standardization of data object expression in a computer can be supported. Also, a complicated mechanism such as an RDB is not necessary in the accumulation of data to be edited, and the accumulation can be enabled in a CSV file with high visibility.

The data editing apparatus 10 allows the user to describe data editing details in an intensive notation language. Thus, as long as the user correctly understands the data editing details, the user can achieve correct data editing even when the user does not actually understand an extensive notation language for operating a computer. In the data editing apparatus 10, data to be edited is stored as a combination of a value and a basis. Thus, the user can easily describe editing details, which are based on a basis, by using the intensive notation. Intensive notation is to reflect the specification of data editing without depending on a computer. Thus, the user can achieve correct data editing as long as the user provides a correct specification description. For example, the user needs to describe data editing details according to a specification without paying attention to a for loop or the like. Therefore, inclusion of bugs in a user code can be reduced. In other words, bug generating parts can be easily limited to bugs of the data itself. For example, in an operation of accounting type data, various transfer processes such as aggregation and proportional division can be robustly described.

Even when there is a change in the format (schema) of data, the data editing apparatus 10 allows the range of effects caused by the change to be limited by performing an editing process for a value based on a basis of the data. For example, even when columns in a table storing data to be edited are switched, effects on editing logic in a user code can be eliminated.

Also, the data editing apparatus 10 allows rules for a transfer process, such as aggregation and proportional division, to be stored in a table outside a program code. Thus, even when there is a change in the rules, data of the table needs to be changed, and effects in the program code can thus be eliminated.

As a modification, the data editing apparatus 10 may further comprise a transfer rule table. The transfer rule table is a memory area that stores a transfer rule to be referred to in a transfer operation (it is assumed to be a basis changing operation that does not involve aggregation or proportional division in this case). The transfer rule is data that associates a basis of a transfer source with a basis of a transfer destination. When a transfer order is set in a user code, the code generation unit 22 generates an execution code for setting an intermediate object F(x) in reference to the transfer rule stored in the transfer rule table. For example, when x=numerical value A<basis of transfer source>, the following is obtained:

F(x)=numerical value A^<basis of transfer source>+numerical value A<basis of transfer destination>. The code generation unit 22 generates an execution code that corresponds to ~(x+F(x)). As a result of executing the code, "numerical value A<basis of transfer source>" is changed to "numerical value A<basis of transfer destination>" in the above example.

(An Overview of a First Embodiment)

1. Smart Grid and Cool Grid:

As partially mentioned above, a smart grid is presently proposed as a technology for managing the urban life as whole. The basic architecture for the smart grid is to design the models comprised of the following three layers mainly in terms of the electric power energy.

1) A measurement layer for measuring the electric power energy.

2) An information and communication layer for electric power.

3) A management layer for managing the electric power in urban areas (cities).

Also, the purpose of the smart grid is to carry out the totally optimized planning. In this planning, the use of resources, including the water resource and so forth, in cities is measured in a comprehensive manner, and the price policy based on the demand and the response, for example, is used as a means for achieving the smart grid.

On the other hand, while the cities are actually renovated, grow and change in a distributed autonomous manner, the inventor of the present invention proposes a "cool grid" that supports the decision-making on the installation and its subsequent operation of various energy-related servers at or on the basis of individual homes (household economies), business facilities and local communities. Hereinafter, the term "household economy" or "household account" may be simply referred to as or meant as "household" also where appropriate.

The cool grid is represented by models comprised of the following five layers.

1) An energy measurement layer.

2) An information-communication layer.

3) An energy data describing layer in households and business facilities: the energy bookkeeping description is performed on the energy servers.

4) A management layer of energy in households and business facilities: The energy-related sales slips in an energy bookkeeping are gathered and then a balance sheet (BL, hereinafter referred to as "energy balance sheet" also) and a profit-and-loss statement (PL, hereinafter referred to as "energy profit-and-loss statement") are created.

5) A management layer for managing the electric power in urban areas (cities).

The smart meter in the past has been developed as a technology concerning the layers described in 1) and 2) of the smart grid. By using the smart meters, the energy consumptions in the households are measured and are aggregated via communication links on a per city basis or on a per-electric power system basis. This has been believed to achieve, for example, the visualization of electric power consumption information in a centralized manner and the policy making on the suppression of the electric power consumption by a system control through the price policy based on the demand and the response, for example.

In contrast to this, in the cool grid proposed by the inventor of the present invention, the energy data describing layer and the energy management layer are newly introduced, in addition to the aforementioned three-layer models, in order to actively incorporate the individual homes, the business facilities and so forth into the entities (active agents) of energy management. Thereby, designing the cities, communities and housing complexes, which are structured under the distributed autonomous energy management by the individual homes and business facilities, forms the basis of the concept of the cool grid. In this design scheme, it is necessary to provide data on energy bookkeeping and energy cost calculation by which the individual operating entities can operate the energy management system, based on their various senses of values, at the levels of household economies and business facilities. For this reason, both the concept of an energy bookkeeping and the concept of a management based on the energy bookkeeping are introduced. The technology described hereinafter may also be regarded as a method for designing the energy bookkeeping for the smart meters.

2. Energy Servers and Energy Events

The stock and flow of energy at an organization are accurately grasped. This can analyze as to what apparatus or device for offering what kind of service (hereinafter referred to as "energy server" also) should possibly be installed at said organization. Analyzing, in this manner, the amount of change or the rate of change in the stock and flow of the energy consumed at an organization by associating it with various energy servers is a basic thing to do in the energy management within the organization. The "organization" as mentioned herein is hereinafter called "business facility" also and typically includes an individual home and an office, and is a concept including a community or a region, which encompasses a plurality of individual homes and offices, and a nation.

Figure 8:
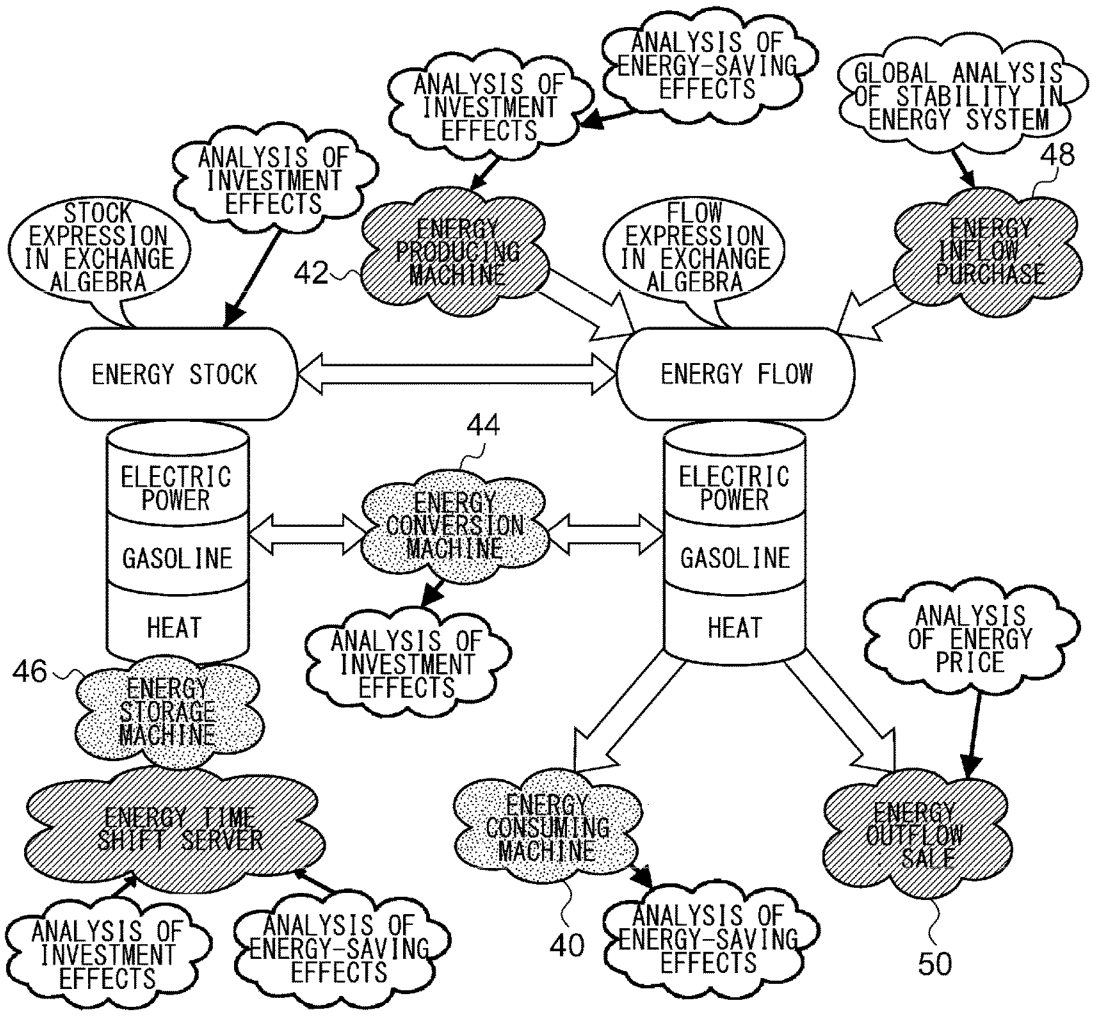
FIG. 8 is a conceptual diagram schematically showing relations between flows and stocks of energy and a group of various servers.

FIG. 8 is a conceptual diagram schematically showing relations between flows and stocks of energy and a group of various servers. In FIG. 8, four dimensions, namely electric power, gasoline, gas and heat, are assumed as the energies to be monitored in terms of changes in the stock and flow thereof. As for these energies to be monitored, various services, such as energy inflow (purchase), energy production, energy consumption, energy outflow (sale), energy storage and time shift in a special form of the energy storage, are taken into consideration. The stock and flow of these energies are measured in units of each energy (quantity) and are simultaneously evaluated as monetary values.

A system capable of describing the stock and flow of goods (merchandise) involving the monetary evaluation thereof in multiple dimensions is the exchange algebra described in the base technology. In the present embodiment, proposed is to perform the energy bookkeeping description of a business facility by using the exchange algebra. The energy bookkeeping by use of the exchange algebra constitutes the energy data describing layer, which is the third layer of the aforementioned cool grid.

A description is now given of five kinds of machine agents that exemplify the energy servers for providing the aforementioned services concerning the stock and flow of the energy.

(1) Energy-consuming-related machine agent (which corresponds to an energy consuming machine 40 of FIG. 8).

a) Illumination-related devices: lamps, fluorescent lamp, etc.

b) Air-conditioning-related apparatuses: air conditioners, electric blankets, etc.

c) Cooking-related devices: microwave ovens, refrigerators, etc.

d) Media-related devices: television sets, video equipment, etc.

e) Washing-related devices: washing machines, drying machines, etc.

f) Communication-related devices: game devices, personal computers, etc.

g) Office-related equipment: facsimile machines, copying machines, etc.

(2) Energy-generation-related machine agent (which corresponds to an energy producing machine 42 of FIG. 8).

a) Solar power generation devices.

b) Wind generation apparatuses.

c) Gas turbine power generation apparatuses.

d) Gasoline-driven power generation devices: hybrid automobiles included.

(3) Energy-conversion-related machine agent (which corresponds to an energy conversion machine 44 of FIG. 8).

a) DC-AC conversion devices.

b) Gas-electricity conversion devices.

Note that, in the energy conversion, the electricity (electric power) conversion is also called "electric power generation" in particular and may be synonymous with the electric power generation.

(4) Energy-storage-related machine agent (which corresponds to an energy storage machine 46 of FIG. 8).

a) Power storage devices: electric storage devices, etc.

b) Gas accumulating devices: compressed gas cylinders, etc.

c) Liquid fuel accumulating devices: gasoline tanks, etc.

d) Heat storage tank.

(5) Energy-purchase-and-sale-related machine agent (which corresponds to an energy purchasing machine 48 and an energy sale machine 50 of FIG. 8).

a) Electricity meters.

b) Gas meters.

c) Electricity selling devices.

Note that exemplary energy-purchase-and-sale related organization agents may include the following:

a) Electric power companies.

b) Communities: corporate enterprises or companies (branches and offices of the corporate enterprises or the companies), schools, public offices, etc.

c) Household economies (household accounts).

Those energy servers carry out processes and thereby the flows or stocks of energy vary. Such a change is called an "energy event". Here, five kinds of energy events corresponding respectively to the above-described five kinds of energy servers are exemplified as follows.

(1) Energy-consuming-related events.

(2) Energy-generation-related events.

(3) Energy-conversion-related events.

(4) Energy-storage/release-related events.

(5) Energy-purchase-and-sale-related events.

3. Energy Data Describing Layer:

In this manner, the energy events are divided into the generation, consumption, conversion, storage/release, and purchase-and-sale of the energy. An energy event is expressed by the following bases and amounts, for instance.

<electric energy (amount of electric power), Wh (watt/hour), time, entity>

<electricity debt, Wh, time, entity>

<electricity credit, Wh, time, entity>

Here, the "entity" is the identity information on a subject (entity), where an energy event occurs, and is typically the aforementioned energy agent. If, for example, data described in units of equipment is considered in units of household account, a transfer for the aggregate of the entity is done. If the data aggregated in units of room or section is to be further aggregated in units of household account and/or aggregated in units of region or nation, this will be done using the transfer conversion of the entity. When the energy is specifically measured, the "unit" as used herein is Wh (watt/hour) for the energy unit. As will be discussed later, "ELUnit", which is an abstract energy unit, is used as a theoretically valid unit. "Time" as used herein is the identity information on a period of time over which the energy events are counted, added up or calculated, and may be the information indicating the date and time of the occurrence of an event or events. For example, such the information may be expressed by year, year/month, year/month/day, X-th quarter of the year Y or the like.

An entity, which appears as the fourth item of a basis, can be described in layers having particle sizes in several stages, so that the entity can be described in a distinguished manner.

1) A layer of household account and business facility: basic description unit.

<electric energy, Wh, time, household account 1>

2) A layer of internal sections in the household account and the business facility.

<electric energy, Wh, time, household account 1: kitchen>

3) An energy-related agent layer within the household account and the business facility.

<electric energy, Wh, time, household account 1: air conditioner>

4) A layer of regions including household accounts.

<electric energy, Wh, time, region 1>

5) A layer of entire system (nation, etc.) including regions.

<electric energy, Wh, time, nation>

These pieces of data measured at the entity levels may possibly undergo various operations and calculations once the level of each basis for the data is matched with each other. In order to match the levels of bases of the data with each other, an aggregation process using a transfer calculation may be carried out. Or alternatively, for example, a process, in which the pieces of data are transferred to and divided into finer classifications by the proportional division calculation, may be carried out.

A description is now given of a basic description method for describing an energy event using the exchange algebra.

1) A description example of an energy-generation-related event in an equipment entity:

x=200<electric energy, Wh, time, solar power generation device>+200<electric power revenue, Wh, time, solar power generation device>

This is a description where the power generation at a solar power generation device is recorded in units of Wh. In practice, it is necessary to add up these in a household account entity. Thus, the above element "x" is transferred to the household account entity, where the solar power generation device is installed, to describe it as z=200<electric energy, Wh, time, household account>+200<electric power revenue, Wh, time, household account>

NOTE: this transfer is calculated as follows, for instance.

a=|200<electric energy, Wh, time, solar power generation device>|, b=|200<electric power revenue, Wh, time, solar power generation device>| y1=a<electric energy, Wh, time, household account>, y2=b<electric power revenue, Wh, time, household account> z=~{x+^x+y1+y2}

2) A description example of an energy-consuming-related event in an equipment entity:

x=400^<electric energy, Wh, time, air conditioner>+400<electric power consumed, Wh, time, air conditioner>

This is a description where the electric power consumed by the air conditioner is recorded. This, too, can be easily transferred to the household account entity.

z=400^<electric energy, Wh, time, household account>+400<electric power consumed, Wh, time, household account>

The consumption data and the like at other equipment can be added up by similarly transferring the data to another data in units of household account. The electric power consumption can be generally regarded that the electric power (electricity) is transferred to some sort of service and then consumed. However, for simplicity, the electric power consumption is herein recorded in the form of a cost.

In terms of service economy, it is assumed that:

x=400^<electric energy, Wh, time, air conditioner>+400<cooling service, Wh, time, air conditioner> and y=400<cooling service consumed, Wh, time, household account>+400^<cooling service, Wh, time, air conditioner>

And it can be understood to state that both the production of service by the electric power and the consumption of this service occur. In practice, depending on purposes, namely in order to clarify what service is produced by an energy and how the service is self-consumed, the description of a type of such service production and service consumption is introduced as appropriate.

3) A description example of an energy-conversion-related event in the household account entity:

x=1000<electric energy, Wh, time, household account>+3^<gas, Kg, time, household account>

This means an energy event where the gas of 3 Kg is converted into an electric energy of 1000 Wh. For example, the event is an energy conversion event in a fuel cell, which can be regarded as some type of an energy-generation-related event where a raw material is required.

4) A description example of an energy-storage-related event in the household account entity:

x=100^<electric energy, Wh, time, household account>+100<electric energy accumulated, Wh, time, household account>

A basis, which is distinct from the electric energy usable in the flow, is used in the electric energy accumulated. This corresponds to a processing, for example, wherein, in an economy description, cash is all deposited in a bank or the like in a certain period of time and therefore the cash and the deposit (savings) are separated. In practice, the electricity (electric power) cannot be physically stored or kept (note that, in an economic system, the cash can be stored or kept as such). Thus, the electricity is consumed and finally disappears as heat or the like unless the electricity is converted into the electric energy accumulated and then stored in an electric storage device. In general, if no electric storage devices is available in a business facility or household, the electric power for the purpose of consumption and the like is dynamically purchased from an electric power company and is managed by an electricity meter and a distribution board so that a balance can be kept between consumption and purchase by time unit.

This description can also be done as follows, for example. That is, for example, the electric energy purchased per household account is transferred to an electric storage device (e.g., lithium-ion battery) and is then described as or in terms of an electric storage device entity.

x=100^<electric energy, Wh, time, electric storage device>+100<electric energy accumulated, Wh, time, electric storage device>

5) A description example of an energy-release-related event in the equipment entity:

x=100<electric energy, Wh, time, electric storage device>+100^<electric energy accumulated, Wh, time, electric storage device>

6) A description example of an energy-purchase-and-sale-related event (electric power purchase) in the household account entity:

x=1000<electric energy, Wh, time, household account>+1000<electricity debt, Wh, time, household account>

This represents a case where the electric energy is purchased in the form of an electricity debt. If the electricity charge is 10 yens per kilowatt/hour (kWh), the transaction of payment can be expressed as follows.

y=1000^<electricity debt, Wh, time, household account>+10^<cash, yen, time, household account>

Here, the units differ and therefore the balance is not kept.

Similarly, a transaction like the purchase of kerosene can also be described.

z=10<kerosene, L, time, household account>+1000^<cash, yen, time, household account>

7) A description example of an energy-purchase-and-sale-related event (electric power selling) in the household account entity:

x=1000^<electric energy, Wh, time, household account>+1000<electricity credit, Wh, time, household account>

4. Case Examples of Energy Bookkeeping

The energy bookkeeping description clarifies a unit of energy and starts with a description of various characteristics for various servers in a business facility. It is assumed hereinafter that the "business facility" includes household accounts as well. Though the energy bookkeeping can be expressed in a normal double-accounting table format, it is difficult to automate or computerize the energy bookkeeping when the table format is used. Expressing the energy bookkeeping by exchange algebra is proposed in the present embodiment. This allows the description of energy events and the calculation of the energy bookkeeping based on the description thereof to be expressed algebraically, thereby achieving the automation or computerization by use of computers.

The electric power energy is expressed in, for example, Wh, which is the unit of electric power multiplied by time. A device, an apparatus or equipment, which consumes the electric power, normally displays the unit indicating the energy consumption per hour. And the energy consumed by a device of 1 watt (W) for an hour is 1 watt/hour (Wh). Similarly, a unit of energy is introduced, as appropriate, for gasoline (liquid fuel), gas and heat. The units of energy for them are expressed as abstract units, for simplicity. It is assumed herein that "ELUnit", "OilUnit", "GasUnit" and "HeatUnit" are abstract units expressing the electric power (electricity), the liquid fuel (e.g., gasoline), gas, and heat, respectively. These units are converted into their energy prices, so that the prices of these units can be displayed.

Consider the energy events in the inflow (purchase), outflow (sale), consumption, conversion, storage (accumulation), production and so forth of energy. Further consider the investment events for which the equipment and apparatuses necessary for a facility investment for the energy production, energy storage (accumulation), energy conversion and so forth are purchased. All events including the energy events and the investment events can be described by using the energy bookkeeping. In the following, the energy events are described, using a system of the abstract units, both in a table form and in a form of exchange algebra and then a comparison is made between them expressed in the different forms.

1) A description example of an energy-purchase-and-sale-related event (electric power purchase) in the household account entity:

Debit side Credit side

On a debit side column of this table, 500<electric energy, ELUnit, time, household account> is entered.

On a credit side column thereof, 50000<cash, yen, time, household account> is entered.

This journalizing result can be expressed by a calculation formula of exchange algebra as follows.

x=500<electric energy, ELUnit, time, household account>+50000^<cash, yen, time, household account>

It is assumed herein that the energy price per ELUnit is 100 yens. Generally, in the present electric power system, the electricity is purchased as much as it is consumed. Though discussed in detail later, recording the journalizing result in such a form of the calculation formula enables a counting processing of journal information using a computer. In other words, recording the journalizing result in such a form of the calculation formula can help achieve the automation (computerization) of calculation.

2) A description example of an energy-consuming-related event in the household account entity:

Debit side Credit side

On the debit side column of this table, 10<electric power consumed, ELUnit, time, household account> is entered.

On the credit side column thereof, 10<electric energy, ELUnit, time, household account> is entered.

x=10<electric power consumed, ELUnit, time, household account>+10^<electric energy, ELUnit, time, household account>

If, in this case, the purchase of electric power is included, the description will be as follows.

Debit side Credit side

On the debit side column of this table, 10<electric energy, ELUnit, time, household account> and 10<electric power consumed, ELUnit, time, household account> are entered.

On the credit side column thereof, 1000<cash, yen, time, household account> and 10<electric energy, ELUnit, time, household account> are entered.

x1=10<electric energy, ELUnit, time, household account>+1000^<cash, yen, time, household account> x2=10<electric power consumed, ELUnit, time, household account>+10^<electric energy, ELUnit, time, household account> y=~(x1+x2)=1000^<cash, yen, time, household account>+10<electric power consumed, ELUnit, time, household account>

If, for example, this is for the electric power used for the washing, the aforementioned form can also be expressed in terms of service economy, as follows.

x2=10<washing service, ELUnit, time, household account>+10^<electric energy, ELUnit, time, household account> x3=10<washing service consumed, ELUnit, time, household account>+10^<washing service, ELUnit, time, household account> y=~(x1+x2+x3)=1000^<cash, yen, time, household account>+10<washing service consumed, ELUnit, time, household account>

3) A description example of solar power generation as an energy-generation-related event in the household account entity:

Debit side Credit side

On the debit side column of this table, 200<electric energy, ELUnit, time, household account> is entered.

On the credit side column thereof, 200<electric power revenue, ELUnit, time, household account> is entered.

x=200<electric energy, ELUnit, time, household account>+200<electric power revenue, ELUnit, time, household account>

4) A description example of kerosene power generation as the energy-conversion-related event in the household account entity:

It is assumed here that the electric power of 300 ELUnits is generated using kerosene of 300 OilUnits Debit side Credit side On the debit side column of this table, 300<electric energy, ELUnit, time, household account> is entered.

On the credit side column thereof, 300<kerosene, OilUnit, time, household account> is entered.

x=300<electric energy, ELUnit, time, household account>+300^<kerosene, OilUnit, time, household account>

5) A description example of an energy-purchase-and-sale-related event (electric power selling) in the household account entity:

It is assumed here that the electric power of 200 ELUnits generated at home is sold at 20,000 yen.

Debit side Credit side

On the debit side column of this table, 20000<cash, yen, time, household account> is entered.

On the credit side column thereof, 200<electric energy, ELUnit, time, household account> is entered.

x=20000<cash, yen, time, household account>+200^<electric energy, ELUnit, time, household account>

6) A description example of an energy-conversion-related event in the household account entity:

It is assumed here that an electric power energy is converted into a thermal energy (ice).

Debit side Credit side

On the debit side column of this table, 100<ice, kg, time, household account> is entered.

On the credit side column thereof, 200<electric energy, ELUnit, time, household account> is entered.

x=100<ice, kg, time, household account>+200^<electric energy, ELUnit, time, household account>

7) A description example of an investment event in the household account entity that purchases a solar power generation device:

Debit side Credit side

On the debit side column of this table, 2,000,000<solar power generation device of 5 kW class, yen, time, household account> is entered.

On the credit side column thereof, 2,000,000<cash, yen, time, household account> is entered.

y=2,000,000<solar power generation device of 5 kW class, yen, time, household account>+2,000,000^<cash, yen, time, household account> is entered.

Here, the purchase of an electric power generation device is described in the sense of double-entry bookkeeping as the description of an investment to the energy server. Thereby, the depreciation and the cost calculation of this device can be carried out. In a straight-line method where the residual value is 0 and the maturity period is five years, the annual repayment amount is 400,000 yens. In contrast to this, the balance of payments (investment effect) of investment costs and power generation profits per business facility (household) is evaluated according to an annual average power generation amount and an electric utility rate. In this manner, the accounting data for use in the energy management including the investment per business facility can be easily constructed, in real time, from the energy bookkeeping, based on the consumption situation of household accounts and the energy cost, by taking into account the investments of various energy-related servers in the household accounts, their depreciations, usages and so forth. Based on this data, an appropriate incentive can be designed as a policy.

5. Energy Management in Units of Business Facility:

The energy management, which becomes feasible by use of the energy bookkeeping, conforms to the analysis of strategic accounting investment effects that uses financial accounting data in a normal business facility. In order to perform the analysis of investment effects, a description of accounting in an applicable transaction area is generally required. In the present embodiment, it is the description of a transaction of energy balance in the business facility. Note, however, that the purpose of an energy management strategy in the present embodiment is not unique and is therefore not limited to a single purpose. In other words, maximizing the profits as a power generation operator is not the sole purpose of the management according to the present embodiment. A general purpose of the energy management is to optimize the total electric power cost in view of the facility investment to a power production server, a storage server and a conversion server and the electric power purchase on the assumption that a server for the energy consumption at a business facility (e.g., household account) is running at a certain satisfactory level. Here, such a server for the energy consumption at the business facility (e.g., household account) may be one of various types of machinery including air conditioners using electricity and factory machines, for instance.

This eventually joins together with the energy purchase and various political incentives on a city level and a community level and contributes to the management of urban energy as an autonomous distributed energy management system. This represents a feature of “cool grid” as meant herein. More specifically, the analysis of investment effects in various kinds of energy servers is strategically made possible from the aforementioned energy accounting data. Here, the various kinds of energy servers include, for example, the storage devices (including electric-powered vehicles), gasoline-driven power generation devices (including hybrid automobiles), solar power generation devices, cogeneration devices, air conditions with energy storage devices, and energy consuming servers where the power-saving measures are taken. Further, in an upper layer of city management, it is possible to metrically argue about, for example, the suitability of a subsidizing policy to these various kinds of energy servers.

6. Case Examples of Energy Management in Units of Business Facility:

A description is given here of a case example as to what kind of management is made available if any particular recording is done in the sense of double-entry bookkeeping. A known description and use of energy events are done in a single-entry bookkeeping manner and is a world of old-fashioned account book so to speak. In contrast to this, the energy bookkeeping system proposed by the inventor of the present invention is developed into a multi-dimensional double-entry bookkeeping system that allows for both indicating the energy in units of appropriate measures and indicating the money amount in units of another appropriate measures.

1) Improvement in use of solar power generation and wind power generation, and the real-time analysis of investment effects The investment effect of an electric power generation server is generally analyzed, even in the past, based on an average power generation amount and an energy cost. In contrast, managing the energy events using the energy bookkeeping system not only enables the analysis of the investment effect thereof but also enables suggesting a dynamical operational strategy for the investment.

Using an energy consuming pattern at a business facility derives an optimum strategy according to the detailed use results such as an effect gained, when the electric power of the solar power generation is once accumulated and then time-shifted, and an effect gained by selling the electricity.

2) Real-time improvement in use of power-saving home electrical appliances and the analysis of investment effects A strategy for the cooling processing of a heat storage tank when the air conditioning is replaced by a heat tank (which is of a type that uses ices), for example, is analyzed using a method of accounting.

The optimization in how to use an electricity storage server when it is installed in household and the optimization in use of a cogeneration server at home are achieved.

Detailed Description of the First Embodiment

A detailed description is now given of an information processing system where the cool grid outlined as above is reduced to a practice or embodied.

Figure 9:
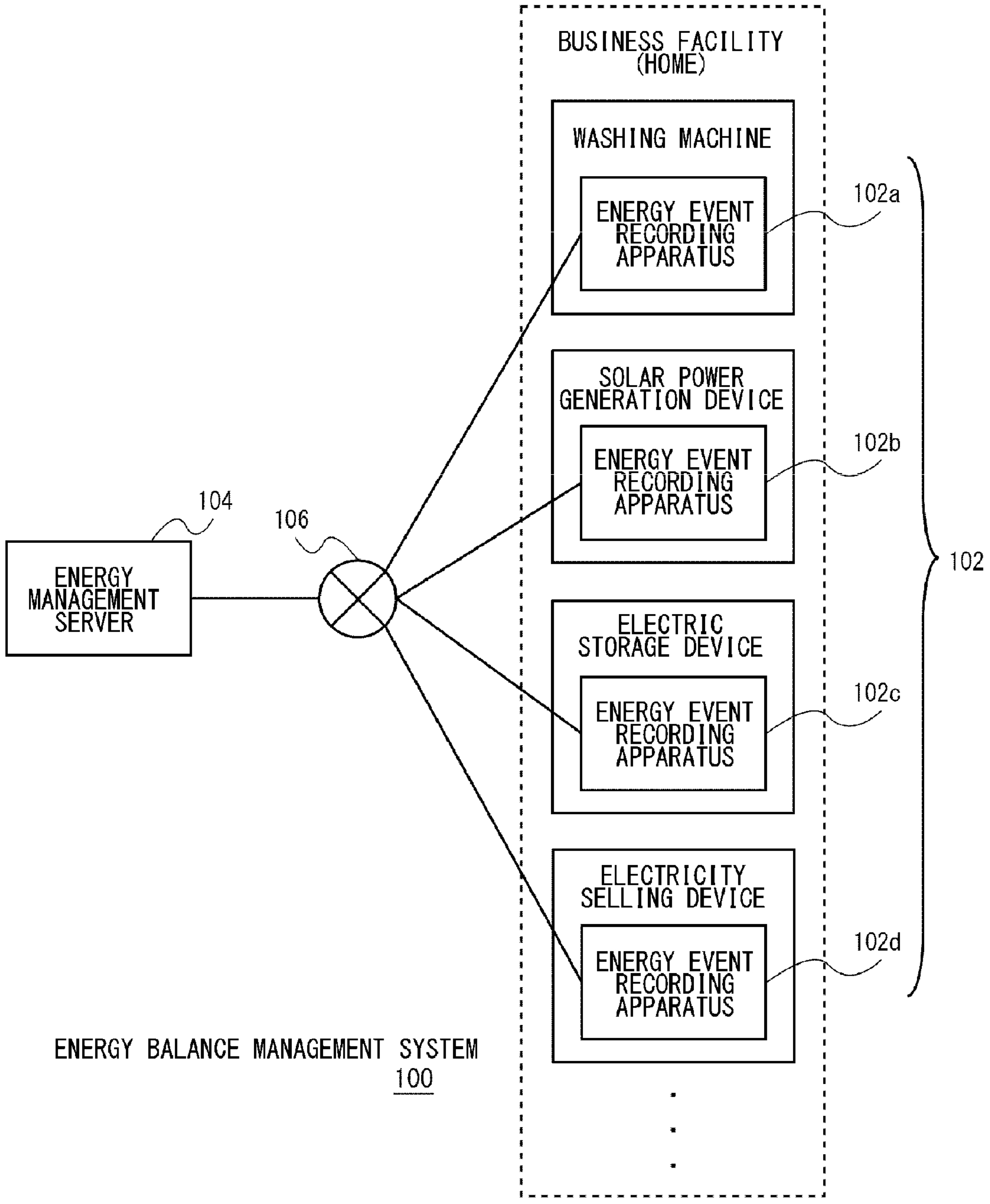
FIG. 9 shows a configuration of an energy balance management system according to a first embodiment.

FIG. 9 shows a configuration of an energy balance management system according to a first embodiment. An energy balance management system 100 includes a plurality of energy event recording apparatuses 102 built into a plurality of equipment or devices installed in a business facility (at home, in this example) and an energy management server 104. Each device is connected via a communication network 106 including a wireless communication network and a wired communication network.

The energy event recording apparatuses 102 of FIG. 9 include an energy event recording apparatus 102*a* mounted to a washing machine, an energy event recording apparatus 102*b* mounted to a solar power generation device, an energy event recording apparatus 102*c* mounted to an electric storage device, and an energy event recording apparatus 102*d* mounted to an electricity selling device. The energy event recording apparatuses 102 may be implemented and achieved as a microcontroller including a microprocessor unit (MPU), memory and a communication device therein or may be incorporated into an energy server or energy servers of different kind (not shown in FIG. 1).

Hereinafter, an equipment or device into which the energy event recording apparatus 102 is incorporated or built, is also called "equipment (or device) to be monitored" or "monitored equipment (or monitored device)". Also, the fact that a change or changes in the flows or stocks of various energies occurs/occur in the equipment to be monitored is called an "energy event" also. The energy event includes, for example, performing a washing action of the washing machine by consuming the electricity, generating the electricity (electric power) by the solar power generation device, storing the electricity by consuming the electricity by the electric storage device, and so forth.

The energy event recording apparatuses 102 constitute a third layer of the cool grid. Each of the energy event recording apparatuses 102 detects the occurrence of an energy event in the device to be monitored and then conveys journal information, which has recorded the content thereof, to the energy management server 104. The energy management server 104, which constitutes a fourth layer of the cool grid, is an information processing apparatus that manages the balance of energy in units of business facility. The energy management server 104 gathers the journal information from a plurality of energy event recording apparatuses 102, respectively, and creates various accounting data such as an energy accounting report and an analysis of investment effects per business facility.

Though the energy balance management system 100 of FIG. 9 shows an exemplary case where the energy balance of each home is managed, the energy balance may be managed within a single company (within a single office of the company), for example. Also, the energy balance may be managed within a community including a plurality of homes and companies, regions, or within a nation. A plurality of energy management servers 104 may be provided hierarchically. In this hierarchically structured case, there may be provided an energy management server for managing the energy balance in units of home/company, an energy management server for managing it in units of community, an energy management server for managing it in units of region, and so forth, for instance. A lower hierarchical management server may convey the accounting data to a higher hierarchical management server, and the higher or highest hierarchical management server may gather or aggregate data covering a wide range of accounting data.

Figure 10:
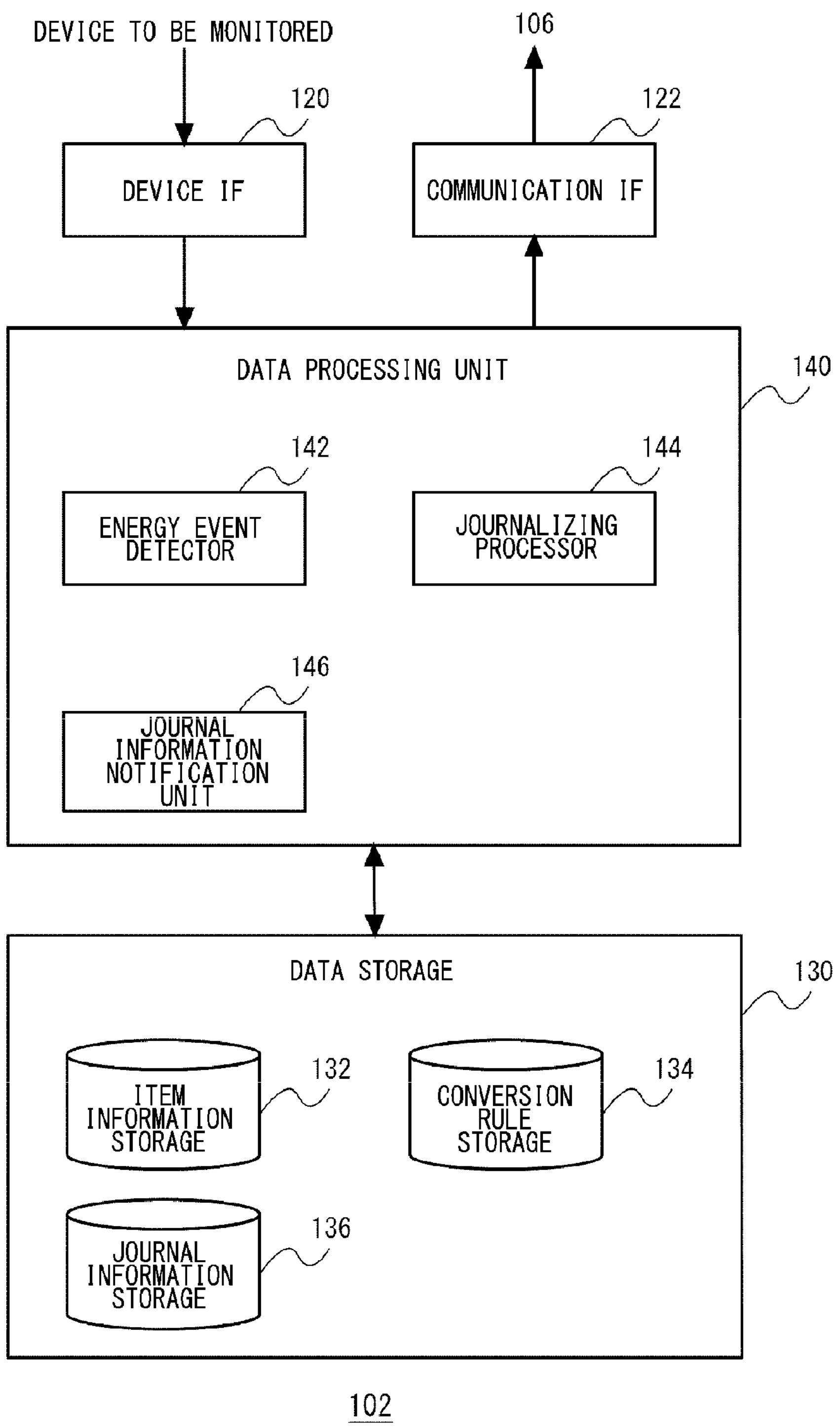
FIG. 10 is a block diagram showing a functional configuration of an energy event recording apparatus of FIG. 9.

FIG. 10 is a block diagram showing a functional configuration of the energy event recording apparatus 102 of FIG. 9. The energy event recording apparatus 102 includes a device interface (IF) 120, a communication interface (IF) 122, a data storage 130, and a data processing unit 140.

The device IF 120 is an interface for data exchange between the device to be monitored and the data processing unit 140. For example, the device IF 120 communicates with a control unit (e.g., MPU) that controls an operation of the washing machine, acquires data, indicating the occurrence of an energy event, from the control unit and then transfers the thus acquired data to the data processing unit 140. The communication IF 122 carries out a communication processing between the energy management server 104 and the data processing unit 140 via the communication network 106. For example, the communication IF 122 may be a radio communication interface including antennas and may transmit and receive data to and from the energy management server 104 via wireless access points in the communication network 106.

The data storage 130 is a memory area where various data relative to the processing done by the data processing unit 140 are stored. The data storage 130 includes an item (subject) information storage 132, a conversion rule storage 134, and a journal information storage 136. The data storage 130 may be realized in the form of a table stored in a RAM or ROM, for instance.

The item information storage 132 is a memory area for storing information on bases described in the base technology. Here, the information is attribute information, concerning the energy, whose value in its amount varies as a result of the occurrence of an energy event. More specifically, the item information storage 132 stores debit side items and credit side items by associating the debit side items and the credit side items. Here, the debit side item indicates an attribute serving as a debit side in a multi-dimensional double-entry bookkeeping system containing the bases concerning the energy, and the credit side item indicates an attribute serving as a credit side in a double-entry bookkeeping system. Also, the attribute serving as the debit side and the attribute serving as the credit side are each an attribute, concerning the energy, whose value changes with a change in the amount of the flow or stock of the energy.

FIG. 11A to FIG. 11D each shows exemplary data stored in the item information storage 132. The information shown in FIG. 11A to FIG. 11D are predetermined per monitored device where the energy event recording apparatus 102 is built into. More specifically, FIG. 11A shows data of the item information storage 132 of the energy event recording apparatus 102*a*, FIG. 11B shows data of the item information storage 132 of the energy event recording apparatus 102*b*, FIG. 11C shows data of the item information storage 132 of the energy event recording apparatus 102*c*, and FIG. 11D shows data of the item information storage 132 of the energy event recording apparatus 102*d*.

The content of an energy event in the device to be monitored are set in an event column. Here, the content of the energy event indicates an operation, a process, a control and so forth to which a change in the amount of the flow or stock of energy occurs. A basis corresponding to an item of a debit-side account in the double-entry bookkeeping system (hereinafter this basis will be referred to as "debit side basis" also) is set as basis data in a debit-side item column. A basis corresponding to an item of a credit-side account in the double-entry bookkeeping system (hereinafter this basis will be referred to as "credit side basis" also) is set as basis data in a credit-side item column. As described in the base technology, the name, the unit, the period and the entity of each item of an account are set in the basis. A value indicating whether or not a "^" (hat) is to be set for the change in the amount of the flow or stock of the energy, namely, indicating whether or not an applicable value is to be treated as a negative value in the exchange algebra, is set in a ^-set-or-not column.

Though not shown in FIG. 11A to FIG. 11D, the item information storage 132 further stores information that defines whether the change in the amount of energy indicated by the energy event detected by an energy event detector 142 (described later) is to become a value of the debit side basis or a value of the credit side basis. This information is set according to the type of a device to be monitored.

The debit side basis or the credit side basis, for which the change in the amount of energy indicated by the energy event detected by the energy event detector 142 is to be set as a numerical value, is hereinafter referred to as "specific basis" also. And the other basis that pairs with this specific basis in the journal information is hereinafter referred to as "subordinate basis" also. Though a specific basis frequently corresponds to a debit side basis, the specific basis becomes a credit side basis if the energy event detector 142 of the energy event recording apparatus 102*d* of FIG. 9 detects the electric energy being sold. In this manner, the specific basis is set to either a debit side basis or a credit side basis, according to the type of the change in the amount thereof detected by the energy event detector 142.

Now refer back to FIG. 10. The conversion rule storage 134 stores the correspondence relationship between the value of a debit side basis and the value of a credit side basis, and stores, for example, the correspondence relationship between the change in the amount of energy and the change in the amount of cash. The correspondence relationship stored in the conversion rule storage 134 is a value set according to the type of a device to be monitored. More specifically, information indicating that 1 ELUnit=100 yens may be stored in the energy event recording apparatus 102*a* and the energy event recording apparatus 102*d*. Also, information indicating that [electric energy]=[electric power revenue (profit)] may be stored in the energy event recording apparatus 102*b*. Also, information indicating that [electric energy accumulated]=[electric energy] may be stored in the energy event recording apparatus 102*c*. Though not shown in FIG. 9, information indicating that 1 GasUnit=10 yens may be stored if the device to be monitored is a gas cooker.

The journal information storage 136 is a memory area where the journal information prepared by the data processing unit 140 is stored. The journal information storage 136 temporarily stores the journal information during a period of time from when the journal information is prepared and until when the journal information is conveyed to the energy management server 104.

The data processing unit 140 carries out various data processes. The data processing unit 140 includes an energy event detector 142, a journalizing processor 144, and a journal information notification unit 146. The data processing unit 140 may be realized such that a program module associated with each functional block is stored in memory, for example, and these program modules are executed by MPU.

The energy event detector 142 detects, via the device IF 120, whether or not an energy event has occurred in the device to be monitored. If, for example, the washing action is performed by the washing machine, which is the device to be monitored, the fact of the washing action performed thereby and the electric energy consumed by the washing action will be acquired from the control unit (e.g., MPU). In this case, the energy event detector 142 may also acquire the consumed electric energy from an electricity meter, which is provided in the washing machine, while the energy event detector 142 acquires the fact of the washing action performed thereby. If, similarly, an electric power generation process is carried out by the "solar power generation device", which is the device to be monitored, the energy event detector 142 will acquire the fact of the power generation performed thereby and the power generation amount from the control unit. In this case, too, the power generation amount may be acquired from the electricity meter provided in the solar power generation device.

The journalizing processor 144 creates journal information indicating an energy event detected by the energy event detector 142. More specifically, the item information storage 132 is referenced and then a numerical value indicating the flow or stock of energy in an object to be monitored is associated with the debit side basis or the credit side basis, which serves as the specific basis. Along with this, the conversion rule storage 134 is referenced and then a value corresponding to the change in the amount of energy is associated with the debit side basis or the credit side basis, which serves as the subordinate basis. The journalizing processor 144 records an element, which indicates the sum of the debit side basis and its value and the credit basis and its value, in the journal information storage 136 as the journal information.

Though not shown in FIG. 10, the data storage 130 may further include a transfer rule storage that stores correspondence relationships between transfer source entities (e.g., the devices to be monitored) and transfer destination entities (e.g., organizations such as homes and business facilities). The journalizing processor 144 may carry out a mode, which facilitates the counting processing that counts or aggregates the entity of each basis for the journal information according to the correspondence relationship of the transfer rule storage. For example, the journalizing processor 144 may carry out the calculation of transfer to the entities indicating the organizations such as household accounts and business facilities.

When detected is predetermined timing with which the occurrence of an energy event should be conveyed to the energy management server 104, the journal information notification unit 146 sends the journal information recorded in the journal information storage 136 to the energy management server 104 via the communication IF 122. This timing may be timing with which new journal information is recorded in the journal information storage 136. Or this timing may be timing with which the system time managed by the energy event recording apparatus 102 hits a preset time. The journal information notification unit 146 may notify the energy management server 104 of the journal information periodically, e.g., at every quarter of the day.

Figure 12:
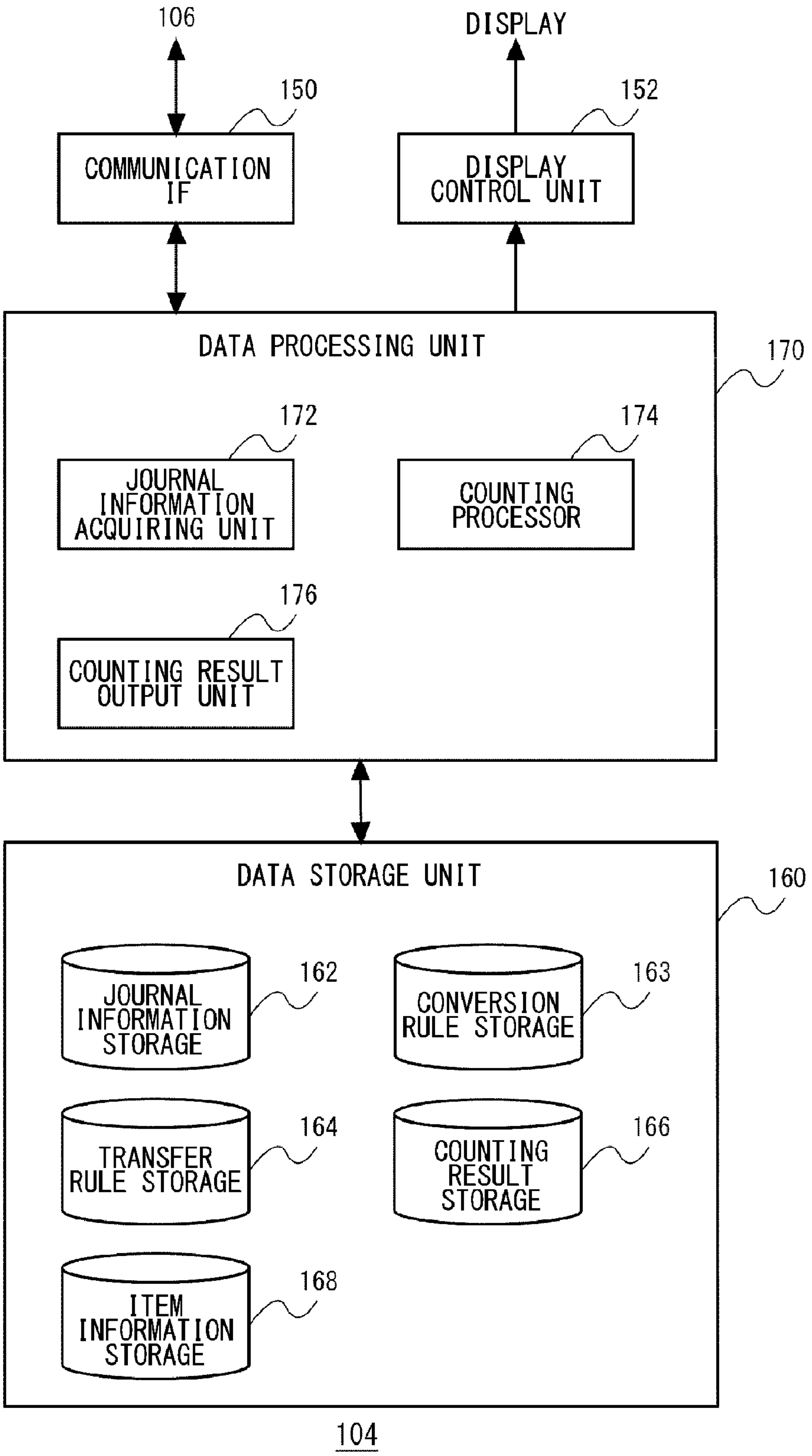
FIG. 12 is a block diagram showing a functional configuration of an energy management server of FIG. 9.

FIG. 12 is a block diagram showing a functional configuration of the energy management server 104 of FIG. 9. The energy management server 104 includes a communication interface (IF) 150, a display control unit 152, a data storage unit 160, and a data processing unit 170.

The communication IF 150 carries out a communication processing with a plurality of energy event recording apparatuses 102, respectively, via the communication network 106. The communication IF 150 also carries out the communication processing with an external apparatus (not shown in FIG. 9) via the communication network 106. Here, the external apparatus may be, for example, a personal computer (PC) of a consultant who requests that the accounting data be looked at for reference. The display control unit 152 sends out image data to a predetermined display unit and controls the content displayed by the display unit.

The data storage 160 is a memory area where various data relative to the processing done by the data processing unit 170 are stored. The data storage 160 includes a journal information storage 162, a conversion rule storage 163, a transfer rule storage 164, a counting result storage 166, and an item information storage 168. The data storage 160 may be realized in the form of a table stored in a RAM, ROM or any of other various storages, for instance.

The journal information storage 162 is a memory area where the journal information conveyed from the plurality of energy event recording apparatuses 102, respectively, is stored.

The conversion rule storage 163 stores a correspondence relationship used for the purpose of converting a change in the amount of energy into a change in the amount of cash. For example, information indicating that 1 ELUnit=100 yens may be stored in the conversion rule storage 163, and information indicating that 1 GasUnit=10 yens may be stored therein.

The transfer rule storage 164 is a memory area where rules required for the transfer calculation are stored. More specifically, stored are a correspondence relationship between the basis of the transfer source and the basis of the transfer destination and a correspondence relationship (conversion rate) between a numerical value associated with the basis of the transfer source and the numerical value associated with the basis of the transfer destination.

FIG. 13 shows exemplary data stored in the transfer rule storage 164. A record 80 is a transfer rule with which to transfer the electric power revenue (a value X) at the debit side basis to the internal reserve (the value of which is the same X as that of the electric power revenue) at the credit side basis. A record 82 is a transfer rule with which to transfer the consumed electric power (a value Y) at the credit side basis to the internal reserve (the value of which is the same Y as that of the consume electric power) at the debit side basis. Note that the internal reserve is a basis that is used when it is posted to an item of net asset in a balance sheet, and the internal reserve generally corresponds to a surplus money. However, what is meant here does not necessarily mean the cash and therefore a theoretical term "internal reserve account" or the like is used here. In practice, the transfer rule storage 164 may store data, which represents the transfer rule of FIG. 13 and which is calculated using the following calculation formula (y[transfer]).

y[transfer]=X^<electric power revenue, yen, time, household account>+X<internal reserve, yen, time, household account>+Y^<electric power consumed, yen, time, household account>+Y^<internal reserve, yen, time, household account>

Now refer back to FIG. 12. The counting result storage 166 is a memory area where the counting results (aggregate results or calculated results) of the journal information conveyed from the plurality of energy event recording apparatuses 102, respectively, are stored. More specifically, data of a trial balance of balances, data of profit-and-loss statements and data of balance sheets are stored as the aggregate results.

The item information storage 168 stores definitions by which to determine whether each basis contained in the data of trial balance of balances and the data of balance sheets prepared by a counting processor 174 (described later) belongs to a debit side or a credit side of the trial balance of balances and the balance sheet. For example, a definition is made such that the consumed electric power, the accumulated electric energy and the cash associated with positive values (^ being not set) belong to the debit side and such that, on the other hand, the consumed electric power, the accumulated electric energy and the cash associated with negative values (^ being set) belong to the credit side. Also, the definition is made such that the electric power revenue and the internal reserve associated with positive values belong to the debit side and such that, on the other hand, the electric power revenue and the internal reserve associated with negative values belong to the credit side.

The data processing unit 170 carries out various kinds of data processings. The data processing unit 170 includes a journal information acquiring unit 172, a counting processor 174, and a counting result output unit 176. The data processing unit 170 may be realized such that a program module associated with each functional block is stored in memory and these program modules are executed by a central processing unit (CPU).

The journal information acquiring unit 172 acquires, via the communication IF 150, the journal information sent respectively from the plurality of energy event recording apparatuses 102 and then records the thus acquired journal information in the journal information storage 162.

When predetermined counting timing is detected, the counting processor 174 aggregates (counts) a plurality of pieces of journal information recorded in the journal information storage 162, based on the basis set in each journal information. More specifically, the plurality of pieces of journal information are aggregated (counted), based on a credit side basis (credit side item) and a debit side basis (debit side item) in each journal information, according to a specification description of an algebraically intensive process described in the base technology 1 and the base technology 2. The counting timing may be timing with which the notification of the journal information from the plurality of energy event recording apparatuses 102 has completed or may be predetermined timing as the counting time.

As the counting processing, the counting processor 174 basically sums up the values of bases for identical names. Then, the counting processor 174 converts the basis in units of energy into a unit of money amount by referencing the conversion rule storage 163. Thereby, the counting processor 174 prepares the data of the trial balance of balances for the current term and records the thus prepared data thereof in the counting result storage 166. Also, in the data of the trial balance of balances, the counting processor 174 transfers the revenue and the consumption to the internal reserve by referencing the transfer rule storage 164. Thereby, the counting processor 174 prepares the data of the profit-and-loss statement for the current term and records the thus prepared data thereof in the counting result storage 166.

Also, the counting processor 174 sums up the data of the balance sheet for the previous term recorded in the counting result storage 166 (namely, prepared by the counting processor 174 at the past time) and the data of the profit-and-loss statement for the current term. Thereby, the counting processor 174 prepares data of the balance sheet for the current term and records the thus prepared data thereof in the counting result storage 166. In other words, the counting processor 174 prepares a trial balance of balances, an energy profit-and-loss statement and an energy balance sheet by conforming to the multi-dimensional bookkeeping system that allows for both indicating the energy in units of appropriate measures and indicating the money amount in units of another appropriate measures. If the data of the trial balance of balances and the data of the balance sheet are to be prepared, the counting processor 174 will determine if each basis belongs to either a debit side item or a credit side item, by referencing the item information storage 168.

The counting result output unit 176 outputs various accounting data recorded in the counting result storage 166 to a predetermined external apparatus. The accounting data includes the data of a trial balance of balances, the data of profit-and-loss statements and the data of balance sheets. If, for example, upon request from the external apparatus, or predetermined notification timing is autonomously determined, the counting result output unit will transmit the accounting data to a terminal of the consultant, a database server and so forth via the communication IF 150. Also, the counting result output unit 176 supplies the accounting data to the display control unit 152 and has the display control unit 152 display the accounting data on a predetermined display.

Operations of the energy event recording apparatus 102 and the energy management server 104 configured as above will now be described hereinbelow.

As an exemplary scenario of energy accounting, a case is shown where the use of energy per day is divided into four quarterly accounting periods (Note: a quarter of the day will be denoted by a quarterly period, also).

A first quarterly period indicates the accounting for 6 a.m. to 12 noon; for example, the solar power generation at 50%, use of air conditioners at 20%, the power purchase cost at 100%.

A second quarterly period indicates the accounting for 12 noon to 18:00 hour (6 p.m.); for example, the solar power generation at 100%, use of air conditioners at 100%, the power purchase cost at 130%.

A third quarterly period indicates the accounting for 18:00 hour to 24:00 hour (12 midnight); for example, the solar power generation at 0%, use of air conditioners at 30%, the power purchase cost at 50%.

A fourth quarterly period indicates the accounting for 24:00 hour to 6 a.m.

The devices to be monitored include various home electrical appliances. A scenario considered herein is as follows. When sufficient sun lights are available, the air conditioners are utilized during daytime by the electricity storage server that has stored an inexpensive night-time electric power. And the electric power during daytime is sold. The management and administration of the electricity storage server and the solar power generation server are optimized in order to efficiently manage this scenario.

As a specific model case, it is assumed that there is a family of four persons and that only the housewife stays at home during daytime. This household of four persons is the business facility shown in FIG. 9, and the energy event recording apparatuses 102 are mounted to a plurality of home electric appliances, respectively. Assume, for the energy prices for the current term, that 1 ELUnit=100 yens and 1 GasUnit=10 yens. And this conversion information is stored in the conversion rule storage 134 of each energy event recording apparatuses 102 and the conversion rule storage 163 of the energy management server 104.

An outline of the operations thereof is now explained.

1) Each energy-related device or apparatus (namely, each of the energy event recording apparatuses 102 that are built into various home electric appliances) conveys the journal information, in a form of exchange algebra, indicating the content of energy events.

2) The energy management server 104 prepares a trial balance of balances, based on the journal information.

3) The energy management server 104 prepares a financial statement (which comprises a balance sheet and a profit-and-loss statement) in units of quarterly period, based on the trial balance of balances.

The consulting is conducted based on the thus prepared accounting information. Thereby, the decision-making on the installation and its subsequent operation of various energy-related servers at the households, the business facilities and local communities can be supported based on the energy events, which has actually occurred, namely on an evidence basis.

A concrete operation is now explained. Each of the plurality of energy event recording apparatuses 102 mounted respectively to the plurality of home electric appliances operates as follows. That is, as the energy event detector 142 detects the occurrence of an energy event in the device to be monitored, the journalizing processor 144 records the journal information indicating the content of the energy event.

FIG. 14 shows a list of pieces of journal information recorded by the plurality of energy event recording apparatuses 102. Each journal information in FIG. 14 shows an energy event that has happened in the first quarterly period at a single household. Journal information 90 to journal information 96 shown in FIG. 14 are recorded respectively by the energy event recording apparatuses 102*a* to the energy event recording apparatuses 102*d* shown in FIG. 9. As shown in FIG. 14, when the energy event detectors 142 detect energy events, respectively, the journalizing processors 144 of the energy event recording apparatuses 102*a* to the energy event recording apparatuses 102*d* each encodes the journal information as an algebraic data object having an accounting significance and then each records the encoded journal information. Here, the journal information to be encoded is information where a change in the amount of the flow or stock of energy is associated with the various bases including the basis concerning the energy. The journal information notification unit 146 conveys the journal information recorded in its own apparatus 102 to the energy management server 104.

The journal information acquiring unit 172 of the energy management server 104 receives the journal information transmitted respectively from the plurality of energy event recording apparatuses 102 and then stores the journal information in the journal information storage 162. When detected is predetermined timing with which the energy accounting data per quarterly period is to be prepared, the counting processor 174 performs an accounting process on a plurality of pieces of journal information stored in the journal information storage 162.

More specifically, data (z) of a trial balance of balances is first calculated.

z=~(x[washing]+x[air conditioner]+x[TV]+x[microwave oven]+x[electromagnetic cooker]+x[electric pot]+x[gas cooker]+x[solar power generation]+x[power storage]+x[power selling])

z=~(59^<cash, yen, time, household account>+0.58<electric power consumed, ELUnit, time, household account>+0.1<electric power consumed, GasUnit, time, household account>+20<electric energy, ELUnit, time, household account>+20<electric power revenue, ELUnit, time, household account>+10<electric energy accumulated, ELUnit, time, household account>+10^<electric energy, ELUnit, time, household account>+1000<cash, yen, time, household account>+10^<electric energy, ELUnit, time, household account>)

z=0.58<electric power consumed, ELUnit, time, household account>+0.1<electric power consumed, GasUnit, time, household account>+20<electric power revenue, ELUnit, time, household account>+10<electric energy accumulated, ELUnit, time, household account>+941<cash, yen, time, household account>

The counting processor 174 converts the above-described counting results in terms of monetary amounts, according to a conversion rule stored in the conversion rule storage 163, and then calculates data of a trial balance of balances expressed in a money amount, as follows.

z=58<electric power consumed, yen, time, household account>+1<electric power consumed, yen, time, household account>+2000<electric power revenue, yen, time, household account>+1000<electric energy accumulated, yen, time, household account>+941<cash, yen, time, household account> z=59<electric power consumed, yen, time, household account>+2000<electric power revenue, yen, time, household account>+1000<electric energy accumulated, yen, time, household account>+941<cash, yen, time, household account>

The counting processor 174 records the counting results, which have been converted in terms of monetary terms, in the counting result storage 166 as the data of the trial balance of balances.

The counting processor 174 may record the data of the trial balance of balances in a table form, in the counting result storage 166 by referencing the item information storage 168. An exemplary data recording in this case is shown below.

Debit side Credit side

On the debit side column of this table, 59<electric power consumed, yen, time, household account>, 1000<electric energy accumulated, yen, time, household account>, and 941<cash, yen, time, household account> are entered.

On the credit side column thereof, 2000<electric power revenue, yen, time, household is entered.

The counting processor 174 performs the transfer calculation on the data of the trial balance of balances, according to a transfer rule stored in the transfer rule storage 164, and thereby calculates data (x[PL]) of the trial balance of balances for the current term. The transfer calculation performed here is a calculation by which the revenue and the consumption are transferred to the internal reserve.

x[PL]=~(z+y[transfer])

x[PL]=~(59<electric power consumed, yen, time, household account>+2000<electric power revenue, yen, time, household account>+1000<electric energy accumulated, yen, time, household account>+941<cash, yen, time, household account>+59^<electric power consumed, yen, time, household account>+59^<internal reserve, yen, time, household account>+2000^<electric power revenue, yen, time, household account>+2000<internal reserve, yen, time, household account>)

x[PL]=1000<electric energy accumulated, yen, time, household account>+941<cash, yen, time, household account>+1941<internal reserve, yen, time, household account>

The counting processor 174 records the data of the profit-and-loss statement for the current term in the counting result storage 166.

Here, the data of the balance sheet for the previous term (hereinafter referred to as "carried-forward energy balance sheet" also) is stored in advance in the counting result storage 166. Assume that the carried-forward energy balance sheet in this exemplary operation is the following.

z[beginning of first quarterly period BL]=900<cash, yen, time, household account>+100<electric energy accumulated, yen, time, household account>+1000<capital, yen, time, household account>

This can be converted into data in the unit of energy as follows.

z[beginning of first quarterly period BL]=900<cash, yen, time, household account>+1<electric energy accumulated, ELUnit, time, household account>+1000<capital, yen, time, household account>

The counting processor 174 sums up the data of the carried-forward energy balance sheet and the data of the profit-and-loss statement for the current term so as to calculate the data (z[end of first quarterly period BL]) of the balance sheet for the current term.

z[end of first quarterly period BL]=~(z[beginning of first quarterly period BL]+x[PL])

z[end of first quarterly period BL]=~(900<cash, yen, time, household account>+100<electric energy accumulated, yen, time, household account>+1000<capital, yen, time, household account>+1000<electric energy accumulated, yen, time, household account>+941<cash, yen, time, household account>+1941<internal reserve, yen, time, household account>)

z[end of first quarterly period BL]=1841<cash, yen, time, household account>+1100<electric energy accumulated, yen, time, household account>+1000<capital, yen, time, household account>+1941<internal reserve, yen, time, household account>

The counting processor 174 records the data of the balance sheet for the current term in the counting result storage 166.

The counting processor 174 may record the data of the balance sheet in a table form, in the counting result storage 166 by referencing the item information storage 168. An exemplary data recording in this case is shown below.

Debit side Credit side

On the debit side column of this table, 1841<cash, yen, time, household account> and 1100<electric energy accumulated, yen, time, household account> are entered.

On the credit side column thereof, 1000<capital, yen, time, household account> and 1941<internal reserve, yen, time, household account> are entered.

The counting result output unit 176 supplies various kinds of resulting data on the energy accounting recorded in the counting result storage 166 to the external apparatus upon request from the external apparatus or autonomously supplies them to the external apparatus. This external apparatus may be another energy management server ranking in a hierarchy higher than the energy management server 104, according to the present embodiment, which carries out the energy accounting process at each household. In such a case, the other energy management server may carry out the energy accounting process for the entire region including a plurality of households (i.e., may prepare the energy accounting data for a region) and/or may gather the accounting data from a lower hierarchical energy management server that performs the energy accounting at each household.

By employing the energy balance management system 100 according to the present embodiment, the changes relative to the flows and the stocks of energy at organizations in different sizes, levels and stages, such as individual homes and business facilities, are recorded by the energy bookkeeping, namely, the changes relative thereto at those organizations are grasped and managed using a method of the double-entry bookkeeping system. This makes it easy to comprehensively manage the energy at the organizations.

For example, the following advantageous effects (1) to (4) can be achieved by employing the energy balance management system 100 according to the present embodiment.

(1) The energy balance of a city can be simulated using this energy bookkeeping, so that the energy balance management system 100 according to the present embodiment can be utilized for a prediction and a design of the energy system.

(2) An imputation regarding the self-production of energy and the self-consumption of energy can be done and therefore GDP (Gross Domestic Product) of the energy production can be calculated.

(3) If the performance of the energy conversion device has changed, the performance of the energy storage device has changed, the performance of the energy server has changed and so forth, the effect of such changes on the energy calculation can be made easily.

(4) The depreciations about the investment on various energy servers are calculated using the energy bookkeeping recorded by the energy event recording apparatuses 102. This makes it easy to grasp their investment efficiencies.

The changes in the flows and stocks of energy as a result of energy events such as the production, inflow, outflow, conversion, accumulation of energy are described in a form of multi-dimensional bookkeeping system developed as exchange algebra. Thereby, various energy events in a given organization can be described either on a basis of energy unit or on a basis of cost or both and, moreover, the conversion therebetween becomes easier. Hence, various types of analyses can be conducted.

The energy bookkeeping system suggested in the present embodiment is a multi-dimensional bookkeeping system including bases involving not only the monetary amount but also the energy itself and therefore achieves a bookkeeping system that can be expressed by using either a unit representation intrinsic to an energy or a unit representation by monetary amount or by using both of them. Further, the energy bookkeeping system proposed in the present embodiment expresses multi-dimensional bookkeeping data in the form of algebraic objects, thereby facilitating the calculation using a computer.

(Second Embodiment)

A description is now given of a structure of a cool grid, where a plurality of energy balance management systems 100 are hierarchized, according to a second embodiment. As a preferred mode, the cool grid according the second embodiment employs an publish-subscribe architecture.

In a design framework of information processing, there are generally two design patterns, which are a data flow type and a publish-subscribe type (hereinafter referred to as "pub-sub type" also). A system description of pub-sub type is a system of multiple agents, and a data exchange between the agents are performed based on a broker and a tag of data presented to the broker, without specifying a unique name and a unique address of an agent. Here, the data tag is identification information indicating the content of the data and is called "topic" as well. This is an excellent agent-based modeling method to express a scheme or mechanism, where each agent transfers the data to another agent or other agents, as a role attribute of the agent instead of an individual attribute thereof.

Further, a framework in which the data is expressed by an algebraic data object is introduced in order that the data structure unique to each agent and the processes of data processing between agents and between organizations can be explicitly designed. In other words, the data processing carried out when the data is delivered and received between the agents is algebraically specification-described as a set-theoretic computation process for the algebraic data object, as explained in the base technology 1 and the base technology 2. Thereby, a robust development can be possibly achieved where the specification description and the implementation are combined together such that each process of data processing is handled as a sequence of data flows for an algebraic object. In the second embodiment, a description is given of a structure of a cool grid where the advantages of the pub-sub type design pattern and the advantages of the data flow type design pattern using an algebraic specification description are incorporated.

An agent, a broker and a calculator appear. as actors, in a pub-sub-calc & action (hereinafter referred to as "PSCA" also) modeling. The agent not only plays a role of a publisher and a subscriber but also is an entity (including a system and a computer) that performs a certain kind of operation (action) upon receipt of purchased (subscribed) information and/or information on the calculation results.

The broker is an entity (including a system and a computer), which takes a role in distributing the data, through which an agent as the publisher and an agent as the subscriber are connected. An agent applies to the broker for a purchase (subscription) of data to which a certain topic is added. When the data with the topic appended thereto is published to the broker, the broker distributes the data to the agent that applies for the purchase of the topic.

The calculator is an entity (including a system and a computer), which takes a role in performing a certain calculation (processing the information) on input data. In a model according to the second embodiment, the broker transfers the data, required for the calculation, to the calculator. Thus, the calculator is consigned to do calculation, and the calculator returns a calculation result (a result of data processing) to the broker. The broker, in turn, distributes this calculation result to the agent that applies for the purchases of the topic indicating or related to this calculation result.

Figure 15:
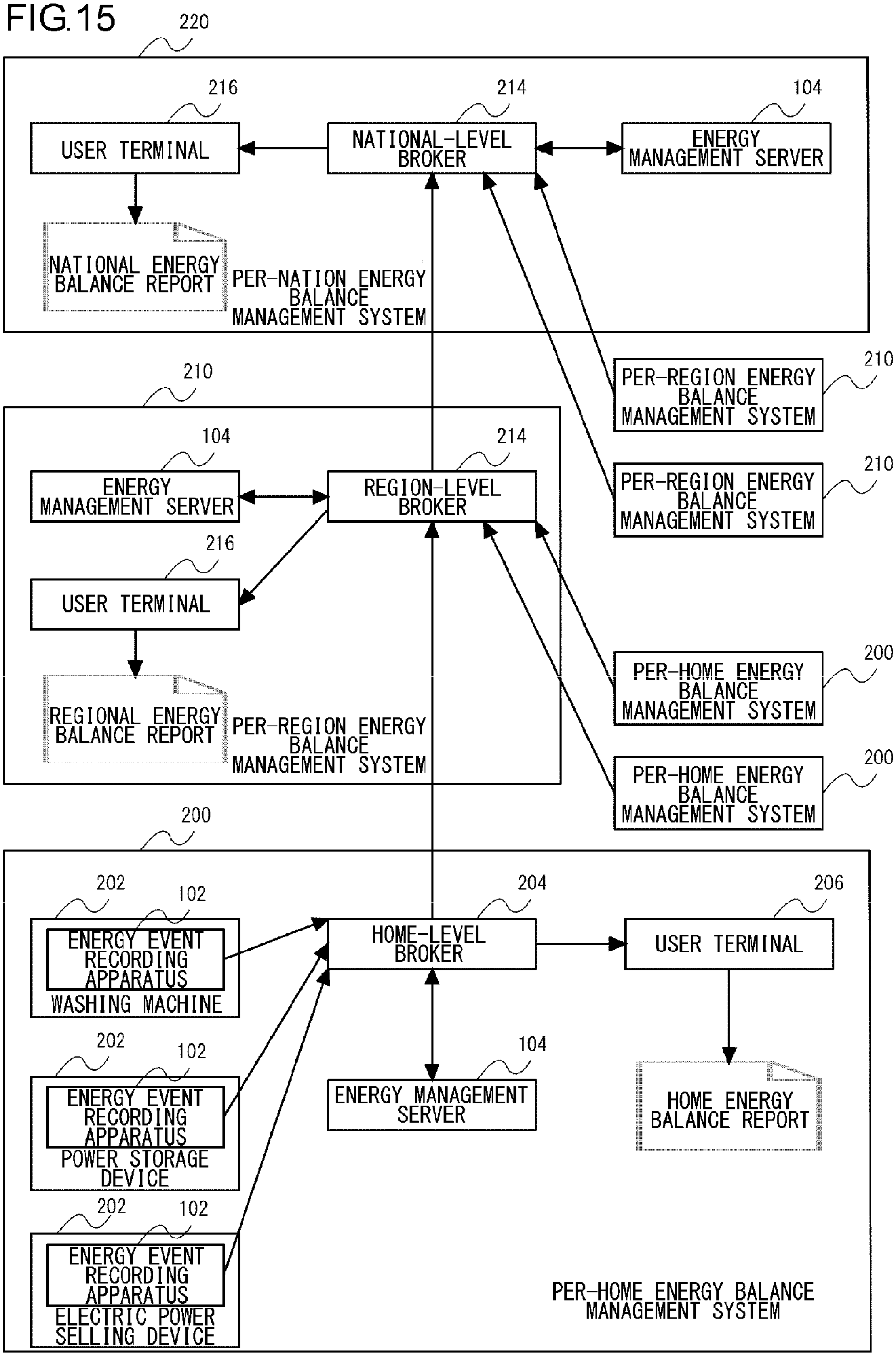
FIG. 15 shows a configuration of an energy balance management system according to a second embodiment.

In the following, a bottom-up design of energy management system is carried out using a PSCA modeling. FIG. 15 shows a configuration of an energy balance management system that has embodied this energy management system. In the second embodiment, the following 1) to 3) are assumed.

1) An energy management system at a household account or a business facility (a per-home energy balance management system 200).
2) An energy management system in a region including a plurality of households and a plurality of business facilities (a per-region energy balance management system 210).
3) An energy management system in a nation including a plurality of regions (a per-nation energy balance management system 220).

The per-region energy balance management system 210 may be installed in units of community and local government that differ in their sizes. Also, the number of hierarchies is not limited to three and an arbitrary number of hierarchies is feasible. For example, the energy balance management system may be configured by five hierarchies. And the five hierarchies are a hierarchy in units of home, a hierarchy in units of city/ward/town/village, a hierarchy in units of state/province (administrative division), a hierarchy in units of region (electric power company), and a hierarchy in units of nation.

In FIG. 15, energy equipment 202 corresponds to an agent serving as a publisher. Similarly, in FIG. 15, a user terminal 206, a user terminal 216 and a user terminal 226 each corresponds to an agent serving as a subscriber. A home-level broker 204, a region-level broker 214 and a national-level broker 224 each corresponds to a broker, and an energy management server 104 in each hierarchy (level) corresponds to a calculator. The home-level broker 204, the region-level broker 214 and the national-level broker 224 each may be realized by a known product that achieves communications between the devices according to MQTT (Message Queue Telemetry Transport), for instance.

In the per-home energy balance management system 200, the energy equipment 202 (e.g., the journal information notification unit 146 of the energy event recording apparatus 102 built into each energy equipment 202) installed at home (within a business facility) publishes an energy event to the home-level broker 204. More specifically, the home-level broker 204 acquires data objects encoded in a form of energy accounting objects, namely journal information, as the energy events. The home-level broker 204 sends these data objects to the energy management server 104. The journal information acquiring unit 172 of the energy management server 104 subscribes these data objects. The counting processor 174 performs energy bookkeeping, based on these data objects and creates an energy profit-and-loss statement and an energy balance sheet in units of household (business facility). Then the counting result output unit 176 publishes the results of these energy bookkeepings to the home-level broker 204.

The user terminal 216 registers beforehand the subscription application, which has specified a topic indicating the calculation result, in the home-level broker 204 and then subscribes, via the home-level broker 204, the energy profit-and-loss statement and the energy balance sheet created by the energy management server 104. Then, a report on an energy balance about a single household (business facility) is outputted. The report may be recorded in a predetermined file and may be displayed on a display in response to a user's operation.

The home-level broker 204 sends the counting results of the journal information acquired from the respective energy equipment 202 to the region-level broker 214. Here, the counting results thereof acquired therefrom are hereinafter simply referred to as "energy accounting data" also and are, for example, the data of the trial balance of balances, the data of the energy profit-and-loss statement and the data of the energy balance sheet prepared by the energy management server 104. The energy accounting data may be replicated between the home-level broker 204 and the region-level broker 214. Each journal information may be sent to the region-level broker 214 as the energy account data.

In the per-region energy balance management system 210, the region-level broker 214 sends the energy accounting data, acquired respectively from a plurality of per-home energy balance management systems 200, to the energy management server 104. Though not shown in FIG. 15, in the per-region energy balance management system 210, too, the energy event recording apparatuses 102 may be mounted to the energy equipment, such as electric power generation devices and electric storage devices, which are managed in a region. In this case, the region-level broker 214 sends also the journal information, published by these energy event recording apparatuses 102, to the energy management servers 104. The energy management server 104 prepares an energy profit-and-loss statement and an energy balance sheet in unit of region, based on the energy accounting data acquired from the region-level broker 214. The user terminal 216 registers beforehand the subscription application, which has specified a topic indicating the calculation result, in the region-level broker 214 and then subscribes, via the region-level broker 214, the energy profit-and-loss statement and the energy balance sheet prepared by the energy management server 104. Then, a report on an energy balance covering the entire region is outputted.

Also, the region-level broker 214 sends the energy accounting data prepared by the energy management server 104 to the national-level broker 224. The energy accounting data may be replicated between the region-level broker 214 and the national-level broker 224. Also, the energy accounting data acquired respectively from a plurality of per-home energy balance management systems 200 may be sent to the national-level broker 224 as the energy accounting data.

In the per-nation energy balance management system 220, the national-level broker 224 sends the energy accounting data, acquired respectively from a plurality of per-region energy balance management systems 210, to the energy management server 104. Though not shown in FIG. 15, in the per-nation energy balance management system 220, too, the energy event recording apparatuses 102 may be mounted to the energy equipment, such as electric power generation devices and electric storage devices, which are managed in a nation. In this case, the national-level broker 224 sends also the journal information, published by these energy event recording apparatuses 102, to the energy management servers 104. The energy management server 104 prepares an energy profit-and-loss statement and an energy balance sheet in unit of nation, based on the energy accounting data acquired from the national-level broker 224. The user terminal 226 registers beforehand the subscription application, which has specified a topic indicating the calculation result, in the national-level broker 224 and then subscribes, via the national-level broker 224, the energy profit-and-loss statement and the energy balance sheet prepared by the energy management server 104. Then, a report on an energy balance covering the entire nation is outputted.

In the cool grid according to the second embodiment, the energy accounting used for the energy management at levels of households and business facilities is first carried out using the energy data on the respective energy equipment, in accordance with an energy accounting format. From there, the calculation for the energy management at the levels of regions (communities) is carried out in a bottom-up manner and then an applicable hierarchy is further raised and finally connected to the energy management at the level of a nation.

In the so-called smart grid, data sent from the smart meters is centralized on a server in a data center and thereby the price adjustment based on the demand and the response is aimed. In other words, the construction of an energy management system at the levels of household accounts, business facilities and communities is not intended at all. A concentrated system where the calculation of the data is carried out on a cloud (server) in the data center is assumed for the calculation of the data.

In contrast to the smart grid, the cool grid according to the second embodiment is characterized as follows. An energy management system at a household and a business facility is first constructed. Then, based on the data acquired from this energy management system, provided is a large collection of data required for the power saving at each household and business facility, an investment plan for energy-related equipment, a cost calculation, an electric power selling plan and so forth. Furthermore, if approved by each household and business facility, data aggregated from such a large collection of data will be sent to an energy management system at a community level. At this community level, formulated are another data on a local energy management plan together with the data on the facilities for the electric power generation, the electric storage and the like unique to the community. Moreover, these statistical data is sent to a national government, so that a plan for the national-level energy management can be formulated. In this manner, the cool grid is designed as a hierarchical structure of a bottom-up-like energy management system. This is a scheme where a management system is hierarchically defined, in a bottom-up manner such that, for example, the management system is comprised of a primary entity of energy activities such as household accounts and business facilities and an energy management at a level of a community constituted by a plurality of primary activity entities and is further comprised of an upper energy management system. Precisely opposite to how, in the smart grid, a system is designed as an upper electric power company in a top-down manner, the cool grid is defined and configured as follows. That is, in the cool grid, a household account or a business facility, which constitutes a basic unit element for a whole system up to a nation, is first designed as a system for autonomously managing the energy and then upper energy management systems are hierarchically designed in a bottom-up manner.

A description is hereinbelow given of examples for calculations about an energy bookkeeping calculation where the calculation of distributed streams by PSCA is used. In these examples, the PSCA framework is implemented as a data processing system in the cool grid. Here, the configuration and arrangement are as follows. Local data D1 to Dn gathered manually or by a sensor (e.g., the energy event recording apparatus 102) are used. A calculation process (e.g., the energy bookkeeping calculation) is carried out according to a data size and data selected among the local data D1 to Dn.

Figure 16:
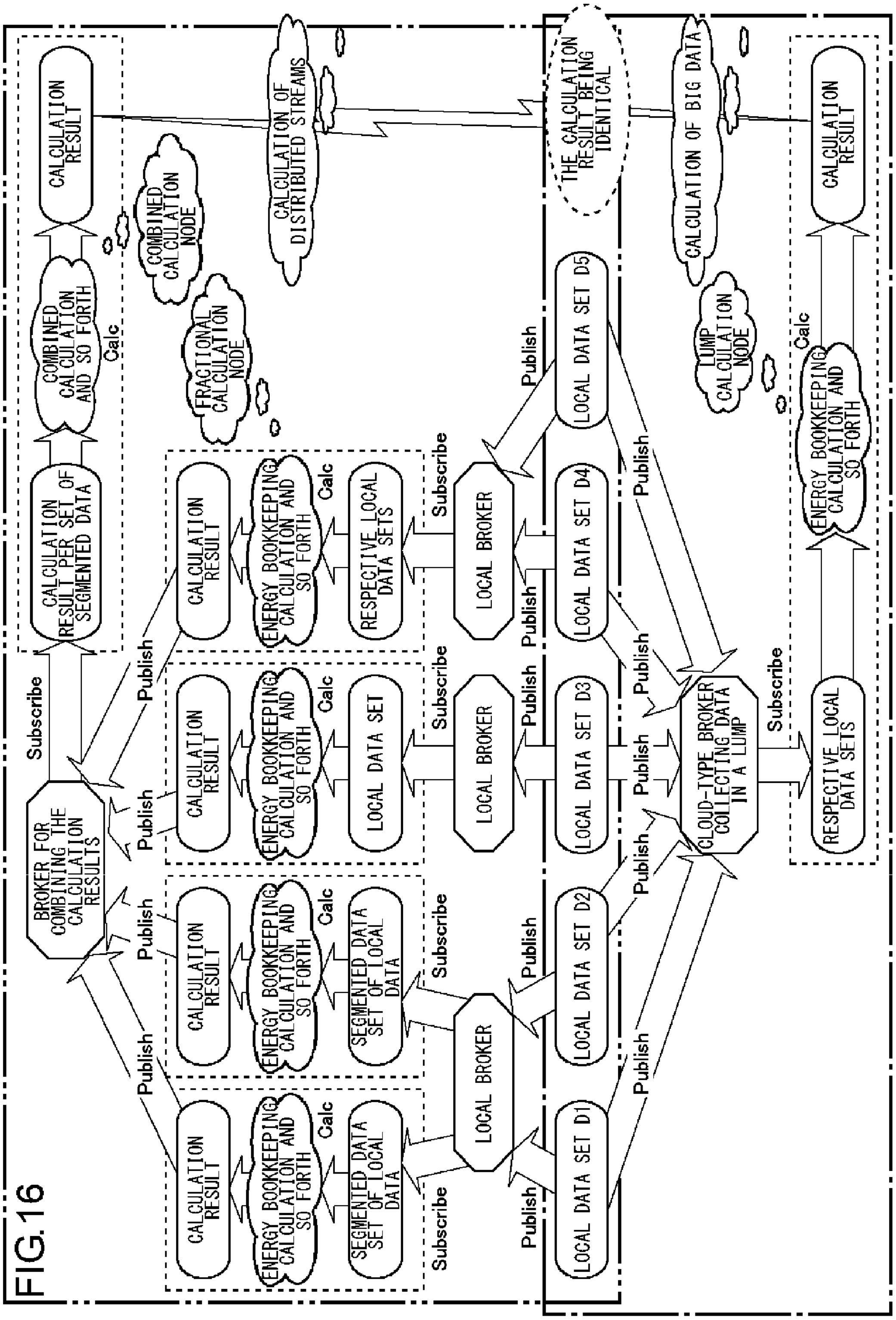
FIG. 16 schematically shows a calculation of distributed streams by PSCA.

FIG. 16 schematically shows a calculation of distributed streams by PSCA. Assume that, for a calculation $F(\Omega)$ carried out for the integrated data which has been combined in a form of $\Omega = D1 \cup D2 \ldots \cup Dn$, F[D1], F[D2], . . . , F[Dn] are each derived as a result of the calculation carried out for each local data set.

At this time, a combined calculation G(F[D1], F[D2], . . . , F[Dn]) is defined for each of F[D1], F[D2], . . . , and F[Dn].

When G(F[D1], F[D2], . . . , F[Dn])=F(Ω) holds, this means the following.

G(F[D1], F[D2], . . . , F[Dn]), where F[D1], F[D2], . . . , and F[Dn] are evaluated at different calculation nodes in the distributed stream calculation of FIG. 16 and then its combined calculation is carried out, is equal to the calculation result of F(Ω), where big data is calculated as a whole at a single node. The former corresponds to the final calculation result at a combined calculation node in an area surrounded by a dashed-two dotted line of FIG. 16. The latter corresponds to the final calculation result at a lump calculation node in an area surrounded by a dashed-dotted line of FIG. 16.

Assume here that, for the accounting data (exchange algebra data) such as an energy item of an account used in this case example, D1, . . . , and Dn are a set of exchange algebra. Also, x[Di] is defined such that $x[Di]=\Sigma\{x|x\in Di\}$, F[Di] is defined such that $F[Di]=\sim x[Di]$, and G(y1, . . . , yn) is defined such that $G(y1, \ldots, yn)=\sim(y1+y2+\ldots+yn)$. Then the following Equation 1 holds.

$$\begin{aligned} F(\Omega) &= F(D1 \cup D2 \ldots \cup Dn) \qquad \text{(Eq. 1)} \\ &= \sim x[D1 \cup D2 \ldots \cup Dn] \\ &= \sim \Sigma\{x \mid x \in D1 \cup D2 \ldots \cup Dn\} \\ &= \sim \Sigma\{x \mid x \in D1\} + \Sigma\{x \mid x \in D2\} + \ldots + \Sigma\{x \mid x \in Dn\} \\ &= \sim \{x[D1] + x[D2] + \ldots + x[Dn]\} \\ &= \sim \{\sim x[D1] + \sim x[D2] + \ldots + \sim x[Dn]\} \\ &= G\{\sim x[D1] + \sim x[D2] + \ldots + \sim x[Dn]\} \\ &= G\{F[D1] + F[D2] + \ldots + F[Dn]\} \end{aligned}$$

$$F(\Omega) = G(F[D1], F[D2], \ldots, F[Dn])$$

Thus, in an operation where the summation is carried out after the bar ("~" in Equation 1) is taken, the calculation result by the distributed streams is equal to the calculation result carried out altogether. In other words, the final calculation result at the combined calculation node in FIG. 16 is equal to the final calculation result at the lump calculation node in FIG. 16. In a calculation where the similar property holds, the pub-sub-calc scheme can execute an enormous amount of calculation in a distributed manner through brokers and then combine the results; namely, the configuration in the area surrounded by the dashed-two dotted line of FIG. 16 can be employed. This eliminates the enormous amount of calculation otherwise carried out by a single node in a lump.

An enormous amount of data streams measured by sensors undergoes the distributed autonomous calculation as used in the cool grid. Thus, instead of a configuration where an extremely large database is created on the cloud and the calculation is done there, namely instead of carrying out the calculation of big data in FIG. 16, the data is locally calculated by the distributed stream calculation at the respective organizations and the like. As a result, the resources (e.g., hardware resources) required of a single computing apparatus (calculator) can be reduced. Furthermore, in the sense that data is used within an organization and is used between organizations, it is natural to produce the data locally and carry out the data processing locally as described above and further carry out an integrated calculation of those locally produced and calculated data at an upper broker (and calculator). Though the capacity of each node is restricted in the distributed stream calculation by pub-sub-calc, a framework of a power distributed stream calculation is given to a class of data calculation that meets a condition of the aforementioned Equation 1.

A description is given of an exemplary configuration of an information processing system that realizes the distributed stream calculation as shown in FIG. 16. This information processing system includes a plurality of distributed calculation devices, corresponding to the energy management servers 104 of FIG. 12, and a single combined calculation device. Also, the information processing system includes a plurality of recording devices corresponding to the energy event recording apparatuses 102 as shown in FIG. 10. Also, this information processing system may be applied to one of or two or more of the energy balance management system 200, the per-region energy balance management system 210, and the per-nation energy balance management system 220 as shown in FIG. 15.

Each of the plurality of recording devices includes a detector, an item information storage, a journalizing processor, and a journal information notification unit. The detector corresponds to the energy event detector 142 and detects a change in the amount of the flow or stock of a predetermined object (a predetermined object, to be monitored, which is not limited to the energy). The item information storage stores a debit side item and a credit side item by associating the debit side item with the credit side item. Here, the debit side item indicates an attribute serving as a debit side in the double-entry bookkeeping system, and the credit side item indicates an attribute serving as a credit side in the double-entry bookkeeping system. Also, the attribute serving as the debit side and the attribute serving as the credit side are each an attribute, concerning the object, whose value changes with the change in the amount of the flow or stock of the object. When the detector detects the change in the amount of the flow or stock of the object, the journalizing processor generates and records the journal information where said amount of change is associated respectively to the debit side item and the credit side item. The journal information generated by each recording apparatus corresponds to the local data set D1 to Dn shown in FIG. 16. The journal information notification unit publishes the thus generated journal information to the brokers.

The plurality of distributed calculation devices corresponds to the distributed calculation nodes shown in FIG. 16. Each of the plurality of distributed calculation devices includes a journal information acquiring unit, a counting processor, and a counting result notification unit. The journal information acquiring unit subscribes data of the journal information, recorded in at least one predetermined recording apparatus/apparatuses, which is/are part of the plurality of recording apparatuses, from the brokers. The counting processor gathers the journal information recorded respectively by at least one recording apparatuses, based on debit side items and credit side items and then records the counting results (aggregated or calculated results). The counting result notification unit publishes data of the counting results to the brokers.

The combined calculation device corresponds to the combined calculation node shown in FIG. 16. The combined calculation device includes an individual counting result acquiring unit, a combining unit, and a combined result output unit. The individual counting result acquiring unit subscribes data of the counting results, recorded respectively by the plurality of distributed calculation devices, from the brokers. The combining unit combines the counting results recorded respectively by the plurality of distributed calculation devices and thereby generates and records data (the calculation result at the combined calculation node shown in FIG. 16) in which the entire journal information, recorded by a plurality of recording apparatuses (typically the all of the recording apparatuses), has been gathered. The combined result output unit outputs the calculation result obtained by the combining unit to a predetermined external apparatus. For example, the combined result output unit has a predetermined display unit display the calculation results.

As described above, the range of applications of the distributed stream calculation by pub-sub-calc is not limited to the cool grid, namely the energy bookkeeping. In other words, the distributed stream calculation by pub-sub-calc is applicable to a general accounting data process and furthermore to a wide range of calculations including the processes using a data algebra such as various kinds of sensor data.

(Third Embodiment)

A description of resources in general about service production type and service consumption type descriptions is explained in a third embodiment. In other words, in the above-described energy bookkeeping according to the first embodiment, it is shown that the description can be made, as necessary, about various resources related to the energy. Also, in the case examples of the energy, it is shown that the description for describing, in detail, which service is to be produced by the energy can be made (description of the service production and the service consumption included). In the third embodiment, it will be shown that the similar description can be made about general resources, which are not limited to the energy.

More specifically, not only the energy but also various kinds of expense items collectively expressed are developed in the forms of a certain service production and its subsequent consumption. In other words, an algebraic expression, which expresses multi-currency and multi-commodity descriptions by the use of exchange algebra, is employed and thereby the various kinds of expense items collectively expressed are segmentalized into further detailed expense items contained therein. This makes it easy to manage the expenses for each of difference purposes of individual services created by the expense items.

(1) Expressing the service production and service consumption about various kinds of resources such as water:

Consider the accounting expression or representation "30000<utilities expense (lighting, heating and water expenses), yen, #, #>+^30000<cash, yen, #, #>". This accounting expression means that the cash of 30,000 yens is paid as the cost, which is the utilities expense (lighting, heating and water expenses). However, this expression does not specifically indicate what kind of service is produced and how it is consumed. It is difficult to appropriately manage the various kinds of resources, including the energy, unless this is clarified. Thus, a description is now given of case examples whereby it is first assumed that a property called the electric energy is purchased and then it is clarified as to which services this property is used for. This approach is applicable to other resources as well.

Assume herein that the utilities expense (lighting, heating and water expenses) of 30,000 yens are allotted such that 10,000 yens is each paid for the purchase of electricity, water and city gas. Then their algebraic expressions are as follows.

(1-1) The purchase of electricity, water and gas as resources:

10000<electricity, yen, #, #>+^10000<cash, yen, #, #>

10000<water, yen, #, #>+^10000<cash, yen, #, #>

10000<city gas, yen, #, #>+^10000<cash, yen, #, #>

These items of information may be measured, from the outset, by a sensor (e.g., a distribution board or a water meter at each house unit). Also, these items of information may be thought of as being derived from another set of data by a transfer calculation such that the lighting, heating and water expenses are proportionally divided in the ratio of 1:1:1.

For one exemplary implementation, when a purchase of resource (the occurrence of an energy event) is detected, the energy event recording apparatus 102 installed in a resource purchasing device (e.g., a distribution board or a water meter) within a business facility in the energy balance management system 100 may record the above calculation formulae as journal data and then convey the journal data to the energy management server 104. For example, when the supply (purchase) of water equivalent to the amount of 10,000 yens is detected, the energy event recording apparatus 102 mounted to the water meter may notify the energy management server 104 of the journal data indicative of the resource "water".

For another exemplary implementation, when a purchase of resource (the occurrence of an energy event) is detected, the energy event recording apparatus 102 may convey the content of information indicative of the event to the energy management server 104. Then the energy management server 104 may record the aforementioned three items of information and aggregate them, as appropriate, similarly to the first embodiment.

For still another exemplary implementation, the transfer rule storage 164 of the energy management server 104 may store a proportional division rule (transfer rule) indicating a ratio where lighting, heating and water expenses are proportionally divided into the ratio of [electricity]:[water]:[city gas]=1:1:1. This energy management server 104 may further include an acquiring unit and a conversion unit (both not shown). The acquiring unit may acquire data indicating the total amount of lighting, heating and water expenses (utilities expense) from a predetermined apparatus, such as an accounting device at a business office. The conversion unit may transfer the total amount of lighting, heating and water expenses to the electricity, water and city gas according to the proportional division rule; in other words, the conversion unit may generate the above three items of journal data and record them. The journal information acquiring unit 172 of the energy management server 104 may acquire a conversion result at the conversion unit, and the counting processor 174 of the energy management server 104 may carry out the counting processing described in the first embodiment, based on the conversion result at the conversion unit.

(1-2) Transfer of resources to various types of services:

As the electricity, water and city gas purchased are converted into various types of services such as the lighting, air conditioning, cleaning, drink and heating, those services can be described as follows.

5000<lighting service, yen, #, #>+^5000<electricity, yen, #, #>

5000<air conditioning service, yen, #, #>+^5000<electricity, yen, #, #>

8000<cleaning service, yen, #, #>+^8000<water, yen, #, #>

2000<drink service, yen, #, #>+^2000<water, yen, #, #>

10000<heating service, yen, #, #>+^10000<city gas, yen, #, #>

Each formula shown above means that the electricity amounting to 5,000 yens is used for the lighting service, and the electricity amounting to 5,000 yens is used for the air conditioning service. In other words, this means that the lighting service amounting to 5,000 yens is produced by the electricity amounting to 5,000 yens, and that the air conditioning service amounting to 5,000 yens is produced by the electricity amounting to 5,000 yens. Similarly, the cleaning service amounting to 8,000 yens is produced by water amounting to 8,000 yens, the drink service amounting to 2,000 yens is produced by water amounting to 2,000 yens, and the heating service amounting to 10,000 yens is produced by the city gas amounting to 10,000 yens. As for these services and resources, a unit of real goods can be used. Note that this is also true for the energy bookkeeping. Thereby, the costs of services for a variety of sizes including a relatively small size of business facilities and households and a relatively large size of cities (regions) can be managed.

For an exemplary implementation, when provision of service (the occurrence of an energy event) is detected similarly to when the resources are purchased, the energy event recording apparatus 102 installed in a service providing apparatus (e.g., a lighting apparatus or a washing machine) within a business facility in the energy balance management system 100 may record the above calculation formulae as journal data and then convey the journal data to the energy management server 104. For example, when the execution (e.g., light is turned on) of the lighting service equivalent to the amount of 5,000 yens is detected, the energy event recording apparatus 102 mounted to the lighting apparatus may notify the energy management server 104 of the journal data indicative of the service "lighting service". It goes without saying that the energy management server 104 may generate journal data similarly to when the resources are purchased.

(1-3) The consumption of various kinds of services:

Many of services for the resources are consumed on the spot or instantly. The consumption situations for the aforementioned services can be expressed as follows.

5000<lighting service consumed, yen, #, #>+^5000<lighting service, yen, #, #>

5000<air conditioning service consumed, yen, #, #>+^5000<air conditioning service, yen, #, #>

8000<cleaning service consumed, yen, #, #>+^8000<cleaning service, yen, #, #>

2000<drink service consumed, yen, #, #>+^2000<drink service, yen, #, #>

10000<heating service consumed, yen, #, #>+^10000<heating service, yen, #, #>

Similar to (1-2) transfer of resources to various types of services, the energy event recording apparatus 102 installed in the service providing apparatus (e.g., a lighting apparatus or a washing machine) within a business facility may record these items of journal data, and the energy management server 104 may also record them.

If the aforementioned consumption items are transferred (aggregated) in a lump, the following formula can be derived.

30000<lighting, heating and water expenses, yen, #, #>+^30000<cash, yen, #, #>

For example, the energy management server 104 may store beforehand the aggregation rules that associate the lighting, heating and water expenses with the aforementioned plurality of consumption items. Then the energy management server 104 may aggregate the journal data (e.g., the aforementioned journal data in (1-3)) conveyed from a plurality of energy event recording apparatuses 102, according to the aggregation rules and thereby may generate the aforementioned formula for the utilities expense (the lighting, heating and water expenses). In this manner, the energy item for each service is measured in a bottom-up manner, so that the status of energy utilization per organization (entire organization) and the status of energy utilization for each different service purpose can be recorded. Also, the energy use for each different service purpose can be easily managed.

(2) The proportional division of service cost in general:

There are cases when it is useful to manage the costs (expenditures) required for various projects by dividing them in units of service. For example, the expression "30000<labor cost, yen, #, #>+^30000<cash, yen, #, #>" means that the cash of 30,000 yens is paid for as a cost item called "labor cost" (e.g., salary). However, this expression does not clarify for what service the labor cost is used.

Thus, similar to the energy bookkeeping, a method for clarifying which particular service the expense item has produced is proposed herein. This approach is applicable to the cost items in general that are to be managed by developing them into individual services. For example, the cost price per project is appropriately managed if the above-described combined accounting expression is proportionally divided as expenditures for a plurality of projects, as follows.

20000<development yen for use in project A, yen, #, #>+^20000<labor cost, yen, #, #>

20000<development yen for use in project B, yen, #, #>+^10000<labor cost, yen, #, #>

A description is now given of a configuration by which to realize a general accounting process, which is not limited to the energy bookkeeping. One information processing apparatus may include a proportional division rule table 18 and a data editing unit 28 (which is herein called "conversion unit") described in the base technology 2. The proportional division rule table 18 may store a correspondence relationship (i.e., a proportional division ratio) between a lump cost item corresponding to the "labor cost" in the above-described combined accounting expression and a plurality of detailed cost items corresponding to the above-described individual services (e.g., "development service for use in project A"). In the aforementioned example, the proportional division rule table 18 may store a rule indicating that the lump cost item "labor cost" is proportionally divided in the ratio of [development service for use in project A]:[development service for use in project B]=2:1. Upon receiving an input of the journal data indicating the combined accounting expression, the conversion unit may generate journal data where the labor cost is proportionally divided according to the proportional division rule, namely journal data indicating the aforementioned cost per project.

By employing the technology proposed in the third embodiment as described above, the proportional division concerning the services in general, which has not been visualized in the conventional practice, and the cost calculation per service can be realized in the same way as the concept of the energy bookkeeping. The technology as proposed in the third embodiment is applicable to not only the energy bookkeeping but also a wide range of extended bookkeepings and the accounting data process.

The inventor of the present invention had also come to recognize that a mechanism for controlling the iteration of parallel computation between nodes (e.g., calculation nodes) be preferably provided in order to efficiently carry out the calculation of distributed streams. A description is hereunder given of a method for realizing this mechanism.

In the calculation of distributed streams, there are times when it is required that a certain process is repeated in a predetermined cycle. The certain process as meant herein is a process in which while the synchronism is kept among a plurality of calculation nodes, the plurality of calculation nodes carry out calculations in parallel with each other such that each calculation node is allotted its own role in the calculation. For example, the accounting calculation is a repetitive calculation per accounting period. More specifically, in the energy accounting, the accounting period is set in units of several minutes to several hours, and a balance sheet and a trial balance concerning an energy are calculated.

In general, a certain fixed time duration (called "tick" also) is defined as a unit, and this unit time is divided into a plurality of slices (called "stages" also). Consider a calculation formula, which is called herein a "stage type calculation model" where the following conditions are met. The conditions are that a causal correlation is permitted before and after the same stage and that the same results are derived in the same stage irrespective of the order in which the calculation is done. An example where the concurrent calculation of distributed streams is managed using brokers is described here as a mechanism by which to carry out an execution process of a calculation, to which the stage type calculation model is applicable. In this mechanism, the execution process of the calculation is performed, within a framework of the pub-sub-calc & action (PSCA), by appropriately controlling the process thereof. More specifically, the calculation of distributed streams is carried out by using the nodes exclusively used to manage the calculation stages, instead of by using the human agents.

Figure 17:
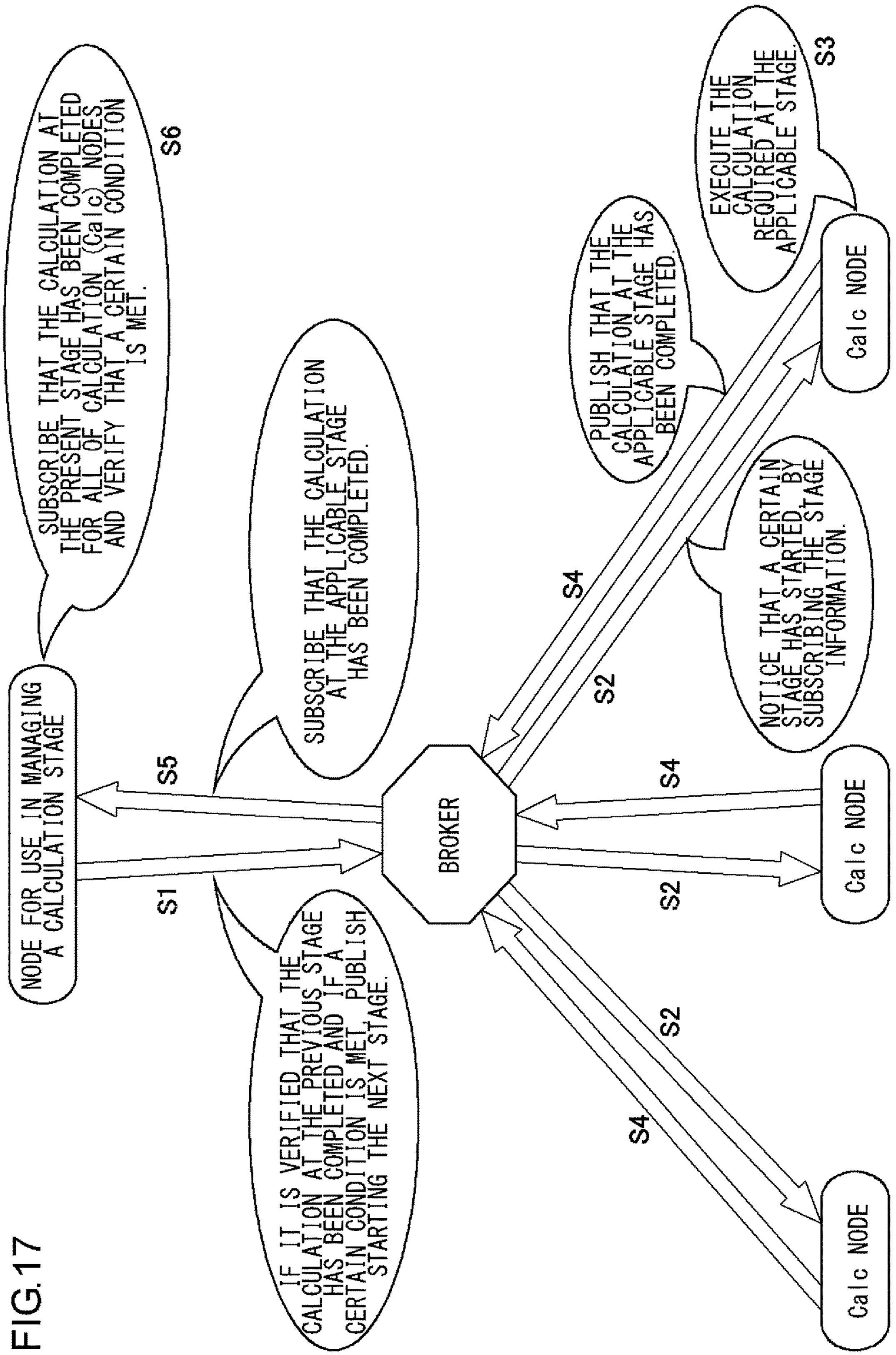
FIG. 17 schematically shows mechanism and arrangement where the calculations of distributed streams are executed and managed in parallel.

FIG. 17 schematically shows mechanism and arrangement where the calculations of distributed streams are executed and managed in parallel. Calc nodes (hereinafter referred to as "calculation nodes") shown in FIG. 17 may correspond to the distributed calculation nodes and the combined calculation node shown in FIG. 16. A node for use in managing a calculation stage shown in FIG. 17 may be a node for exclusive use in the management of calculation stages, which is not shown in FIG. 16. Also, the combined calculation node shown in FIG. 16 may have a function of the node for use in managing the calculation stage shown in FIG. 17. The node for use in managing the calculation stage is hereinafter referred to simply as "stage managing node" also.

If the calculation at the previous stage has been completed and if a certain condition (e.g., a predetermined stage start condition) is met, the stage managing node will publish stage information, indicating a start of the next stage, to a broker (S1). Each calculation node detects that a certain stage has started, by subscribing the stage information sent from the broker (S2). The calculation node carries out a predetermined calculation process, which is determined beforehand at a stage specified by the stage information, (S3), and publishes calculation-completion information indicating that the calculation process has been completed, to the broker (S4). Though not shown in FIG. 17, it goes without saying that the calculation node may publish the information indicating the calculation result to a predetermined broker (e.g., a "broker for combining the calculation results" shown in FIG. 16).

The stage managing node subscribes the calculation-completion information from the broker (S5). The stage managing node verifies whether or not the calculation at the present stage (i.e., at a stage during which the calculation is being executed) has been completed by all the nodes, namely whether or not the calculation-completion information has been conveyed from all of the calculation nodes to which the stage information has been delivered. Further, the stage managing node verifies whether or not a certain condition (e.g., a condition under which the next stage can be started) is met (S6). Then the procedure returns to Step S1, and the Steps S1 to S6 are repeated until all stages to be executed are completed. Typically, different topics are respectively set in the stage information, the calculation-completion information and the information indicating the calculation result, which are published from the broker. Each node identifies the types of the information based on the topics set to the subscribed information.

The present invention has been described based upon the first and third embodiments. These embodiments are intended to be illustrative only and it will be obvious to those skilled in the art that various modifications to constituting elements and processes could be developed and that such modifications are also within the scope of the present invention.

Optional combinations of the aforementioned embodiments and modifications may also be useful as additional modes of the present invention. And it should be understood that new embodiments realized by such combinations and modifications thereof provide their own advantages.

It should be understood by those skilled in the art that the functions to be performed by the constituent features cited in the claims can also be realized by the components shown in the embodiments and modifications thereof alone or in combination.

EXPLANATION OF REFERENCE NUMERALS

100 Energy balance management system
102 Energy event recording apparatus
104 Energy management server
132 Item information storage
142 Energy event detector
144 Journalizing processor
146 Journal information notification unit
172 Journalized information acquiring unit
174 Counting processor
176 Counting result output unit

INDUSTRIAL APPLICABILITY

The present invention is applicable to an information processing apparatus that is to carry out a data editing process.

The invention claimed is:

1. An energy management server for use with a device to be monitored comprising an energy meter, the device to be monitored being configured to output energy event described in a form of exchange algebra occurring in the device to be monitored the energy event being a change in a flow or a stock of energy of the device to be monitored as measured by the energy meter, the energy management server comprising:

- a communication interface configured to receive energy event described in a form of exchange algebra output by the device to be monitored;
- storage configured to store, as a plurality of algebraic data objects, the energy events described in a form of exchange algebra in an energy bookkeeping description including the first term items of exchange algebra describing energy events and a second term items of exchange algebra describing energy events;
- a counting processor configured to, after a predetermined period of time, generate energy accounting data conforming to the energy bookkeeping description by aggregating the energy event described in a form of exchange algebra stored in the storage, based on the first term of exchange algebra describing energy event and the second term of exchange algebra describing energy event;
- a display for displaying the energy accounting data generated by the counting processor; wherein
- the counting processor is configured to perform a transfer process on a result of aggregation by using exchange algebra, and generates the energy accounting data.

2. The energy management server according to claim 1, wherein the counting processor generates an energy balance sheet for a current term, in accordance with the energy balance sheet for a previous term related to a flow or stock of energy in said one or a plurality of devices to be monitored and with an energy profit-and-loss statement for the current term, the energy balance sheet for a previous term being the energy accounting data recorded in the previous term, and an energy profit-and-loss statement for the current term being generated by the energy accounting data for the current term.

3. An energy management method for managing energy balance of a device to be monitored, the device to be monitored being configured to output energy event described in a form of exchange algebra relating to an energy event occurring in the device to be monitored the energy event being a change in a flow or a stock of energy of the device to be monitored as measured by the energy meter, the method comprising:

- receiving energy event described in a form of exchange algebra output by the device to be monitored via a communication interface;
- storing, as a plurality of algebraic data objects, the energy event described in a form of exchange algebra in an energy bookkeeping description including first term items of exchange algebra describing energy events and a second term items of exchange algebra describing energy events;
- recording, with a counting processor after a predetermined period of time, energy accounting data conforming to the energy bookkeeping description by aggregating the energy event described in a form of exchange algebra, based on the first term of exchange algebra describing energy event item and the second term of exchange algebra describing energy event item; and
- displaying the recorded energy accounting data to a display;
- wherein the counting processor aggregates a plurality of pieces of energy event described in a form of exchange algebra in units of each energy, performs a transfer process on a result of aggregation by using exchange algebra, and generates the energy accounting data based on a result of the transfer process.

4. The energy management server according to claim 1, wherein the counting processor aggregates based on a basis in units of energy, converts a result of aggregation into a unit of money amount by referencing a predetermined conversion rule, and generates the energy accounting data base on a result of conversion.

* * * * *